United States Patent
Sjöberg et al.

(10) Patent No.: US 12,389,009 B2
(45) Date of Patent: Aug. 12, 2025

(54) TEMPORAL SUBLAYER INFORMATION FOR VIDEO CODING

(71) Applicant: Telefonaktiebolaget LM Ericsson (publ), Stockholm (SE)

(72) Inventors: Rickard Sjöberg, Stockholm (SE); Martin Pettersson, Vallentuna (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 139 days.

(21) Appl. No.: 18/285,945

(22) PCT Filed: Apr. 12, 2022

(86) PCT No.: PCT/EP2022/059798
§ 371 (c)(1),
(2) Date: Oct. 6, 2023

(87) PCT Pub. No.: WO2022/219002
PCT Pub. Date: Oct. 20, 2022

(65) Prior Publication Data
US 2024/0121397 A1    Apr. 11, 2024

Related U.S. Application Data

(60) Provisional application No. 63/173,828, filed on Apr. 12, 2021.

(51) Int. Cl.
*H04N 19/00* (2014.01)
*H04N 19/136* (2014.01)
(Continued)

(52) U.S. Cl.
CPC ........ *H04N 19/136* (2014.11); *H04N 19/172* (2014.11); *H04N 19/1883* (2014.11); *H04N 19/70* (2014.11)

(58) Field of Classification Search
CPC ...................................................... H04N 19/00
See application file for complete search history.

(56) References Cited

U.S. PATENT DOCUMENTS

| | | | |
|---|---|---|---|
| 2023/0031964 A1* | 2/2023 | Jhu | H04N 19/179 |
| 2023/0109035 A1* | 4/2023 | Hendry | H04N 19/31 375/240.12 |

OTHER PUBLICATIONS

International Search Report and Written Opinion of the International Searching Authority, PCT/EP2022/059798, mailed Aug. 11, 2022, 13 pages.
(Continued)

*Primary Examiner* — Maryam A Nasri
(74) *Attorney, Agent, or Firm* — Sage Patent Group

(57) ABSTRACT

A method for determining one or more temporal sublayer properties from a bitstream is provided. The method includes determining, from the bitstream, a number N of temporal sublayers for which one or more temporal sublayer properties are specified. The method includes for each temporal sublayer of the N temporal sublayers having one or more temporal sublayer property values, decoding the one or more temporal sublayer property values from the bitstream wherein the one or more temporal sublayer property values includes one or more of: sublayer referencing information; output sublayer set information; picture width and picture height per temporal sublayer information; sublayer multiview information; sublayer auxiliary information; and/or sublayer quality information.

20 Claims, 13 Drawing Sheets

(51) Int. Cl.
H04N 19/169 (2014.01)
H04N 19/172 (2014.01)
H04N 19/70 (2014.01)

(56) References Cited

OTHER PUBLICATIONS

Pettersson, Martin et al., "AHG9: Picture output suppression SEI message," Joint Video Experts Team (JVET) of ITU-T SG 16 WP 3 and ISO/IEC JTC 1/SC 29, 21st Meeting, by teleconference, Jan. 6-15, 2021, JVET-U0045-v1, 6 pages.

Sullivan, Gary et al., "Meeting Report of the 21st Meeting of the Joint Video Experts Team (JVET), by teleconference, Jan. 6-15, 2021," Joint Video Experts Team (JVET) of ITU-T SG 16 WP 3 and ISO/IEC JTC 1/SC 29, 21st Meeting, by teleconference, Jan. 6-15, 2021, JVET-U1000, 186 pages.

Boyce, Jill et al., "Additional SEI messages for VSEI (Draft 2)," Joint Video Experts Team (JVET) of ITU-T SG 16 WP 3 and ISO/IEC JTC 1/SC 29, 21st Meeting, by teleconference, Jan. 6-15, 2021, JVET-U2006-v1, 20 pages.

Bross, Benjamin et al., "Versatile Video Coding Editorial Refinements on Draft 10," Joint Video Experts Team (JVET) of ITU-T SG 16 WP 3 and ISO/IEC JTC 1/SC 29, 20th Meeting, by teleconference, Oct. 7-16, 2020, JVET-T2001-v1, 512 pages.

Sjöberg, Rickard et al., "AHG9: Temporal sublayer information SEI message," Joint Video Experts Team (JVET) of ITU-T SG 16 WP 3 and ISO/IEC JTC 1/SC 29, 22nd Meeting, by teleconference, Apr. 20-28, 2021, JVET-V0071, 6 pages.

International Telecommunication Union, "Series H: Audiovisual and Multimedia Systems, Infrastructure of audiovisual services—Coding of moving video, Versatile video coding," Recommendation ITU-T H.266, Aug. 2020, 516 pages.

International Telecommunication Union, "Series H: Audiovisual and Multimedia Systems, Infrastructure of audiovisual services—Coding of moving video, Versatile supplemental enhancement information messages for coded video bitstreams," Recommendation ITU-T H.274, Aug. 2020, 86 pages.

* cited by examiner

DETERMINING, FROM THE BITSTREAM, A NUMBER N OF TEMPORAL SUBLAYERS FOR WHICH ONE OR MORE TEMPORAL SUBLAYER PROPERTIES ARE SPECIFIED
701

FOR EACH TEMPORAL SUBLAYER OF THE N TEMPORAL SUBLAYERS HAVING ONE OR MORE TEMPORAL SUBLAYER PROPERTY VALUES, DECODING THE ONE OR MORE TEMPORAL SUBLAYER PROPERTY VALUES FROM THE BITSTREAM WHEREIN THE ONE OR MORE TEMPORAL SUBLAYER PROPERTY VALUES COMPRISES ONE OR MORE OF:
  SUBLAYER REFERENCING INFORMATION;
  OUTPUT SUBLAYER SET INFORMATION;
  PICTURE WIDTH AND PICTURE HEIGHT PER TEMPORAL SUBLAYER INFORMATION;
  SUBLAYER MULTIVIEW INFORMATION;
  SUBLAYER AUXILIARY INFORMATION; AND/OR
  SUBLAYER QUALITY INFORMATION
703

DECODING A PICTURE FROM THE BITSTREAM BASED ON THE ONE OR MORE TEMPORAL SUBLAYER PROPERTY VALUES OF AT LEAST ONE TEMPORAL SUBLAYER
705

Figure 7

DECODING A SET OF SYNTAX ELEMENTS INTO A SET OF SYNTAX ELEMENT VALUES WHEREIN EACH FIRST SYNTAX ELEMENT VALUE IN THE SET OF SYNTAX ELEMENT VALUES SPECIFIES WHETHER OR NOT A FIRST TEMPORAL SUBLAYER OF THE N NUMBER OF TEMPORAL SUBLAYERS IS NOT A DIRECT REFERENCE SUBLAYER TO A SECOND TEMPORAL SUBLAYER OF THE N NUMBER OF TEMPORAL SUBLAYERS
801

Figure 8

DETERMINING AT LEAST ONE OUTPUT SUBLAYER SET O COMPRISING TEMPORAL SUBLAYERS BY DECODING A FIRST SET OF SYNTAX ELEMENTS FROM THE BITSTREAM
901

OUTPUTTING PICTURES THAT ARE INCLUDED IN TEMPORAL SUBLAYERS THAT ARE INCLUDED IN THE AT LEAST ONE OUTPUT SUBLAYER SET O.
903

Figure 9

DETERMINING FROM THE BITSTREAM, FOR EACH TEMPORAL SUBLAYER IN THE OUTPUT SUBLAYER SET O, WHETHER THE TEMPORAL SUBLAYER IS AN OUTPUT SUBLAYER IN THE OUTPUT SUBLAYER SET O OR IS A NON-OUTPUT SUBLAYER IN THE OUTPUT SUBLAYER SET O, WHEREIN THE OUTPUT SUBLAYER SET O CONTAINS AT LEAST ONE TEMPORAL SUBLAYER THAT IS AN OUTPUT SUBLAYER AND WHEREIN THE OUTPUT SUBLAYER SET O CONTAINS AT LEAST ONE TEMPORAL SUBLAYER THAT IS A NON-OUTPUT SUBLAYER
1001

OUTPUTTING ONLY TEMPORAL SUBLAYERS THAT ARE INCLUDED IN THE AT LEAST ONE OUTPUT SUBLAYER SET O AND DETERMINED FROM THE BITSTREAM TO BE AN OUTPUT SUBLAYER IN THE OUTPUT SUBLAYER SET O.
1003

Figure 10

```
┌─────────────────────────────────────────────────────────────┐
│  DETERMINING THAT A QUALITY OF A FIRST TEMPORAL SUBLAYER    │
│  IS HIGHER THAN A QUALITY OF A SECOND TEMPORAL SUBLAYER     │
│                          1501                                │
└─────────────────────────────────────────────────────────────┘
```

Figure 15

```
┌─────────────────────────────────────────────────────────────┐
│  DETERMINING A NUMBER N OF TEMPORAL SUBLAYERS HAVING        │
│  ONE OR MORE TEMPORAL SUBLAYER PROPERTY VALUES TO BE        │
│                 ENCODED INTO THE BITSTREAM                   │
│                          1601                                │
└─────────────────────────────────────────────────────────────┘
                              │
                              ▼
┌─────────────────────────────────────────────────────────────┐
│     FOR EACH TEMPORAL SUBLAYER OF THE N TEMPORAL            │
│  SUBLAYERS HAVING ONE OR MORE TEMPORAL SUBLAYER             │
│  PROPERTY VALUES, ENCODING THE ONE OR MORE TEMPORAL         │
│  SUBLAYER PROPERTY VALUES INTO THE BITSTREAM WHEREIN        │
│  THE ONE OR MORE TEMPORAL SUBLAYER PROPERTY VALUES          │
│  COMPRISES ONE OR MORE OF:                                   │
│       SUBLAYER REFERENCING INFORMATION;                      │
│       OUTPUT SUBLAYER SET INFORMATION;                       │
│       PICTURE WIDTH AND PICTURE HEIGHT PER TEMPORAL          │
│  SUBLAYER INFORMATION;                                       │
│       SUBLAYER MULTIVIEW INFORMATION;                        │
│       SUBLAYER AUXILIARY INFORMATION; AND/OR                 │
│       SUBLAYER QUALITY INFORMATION                           │
│                          1603                                │
└─────────────────────────────────────────────────────────────┘
                              │
                              ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  ENCODING A PICTURE INTO THE BITSTREAM BASED ON THE ONE
│    OR MORE TEMPORAL SUBLAYER PROPERTY VALUES                │
                            1605
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Figure 16

ENCODING A SET OF SYNTAX ELEMENT VALUES INTO A SET OF SYNTAX ELEMENTS WHEREIN EACH FIRST SYNTAX ELEMENT VALUE IN THE SET OF SYNTAX ELEMENT VALUES SPECIFIES WHETHER OR NOT A FIRST TEMPORAL SUBLAYER OF THE N NUMBER OF TEMPORAL SUBLAYERS IS NOT A DIRECT REFERENCE SUBLAYER TO A SECOND TEMPORAL SUBLAYER OF THE N NUMBER OF TEMPORAL SUBLAYERS
1701

Figure 17

DETERMINING AT LEAST ONE OUTPUT SUBLAYER SET O COMPRISING TEMPORAL SUBLAYERS
1801

ENCODING INTO THE BITSTREAM, INFORMATION SPECIFYING WHICH TEMPORAL SUBLAYERS THAT ARE INCLUDED IN THE AT LEAST ONE OUTPUT SUBLAYER SET O.
1803

Figure 18

ENCODING INTO THE BITSTREAM, FOR EACH TEMPORAL SUBLAYER IN THE OUTPUT SUBLAYER SET O, INFORMATION INDICATING WHETHER THE TEMPORAL SUBLAYER IS AN OUTPUT SUBLAYER IN THE OUTPUT SUBLAYER SET O OR IS A NON-OUTPUT SUBLAYER IN THE OUTPUT SUBLAYER SET O, WHEREIN THE OUTPUT SUBLAYER SET O CONTAINS AT LEAST ONE TEMPORAL SUBLAYER THAT IS AN OUTPUT SUBLAYER AND WHEREIN THE OUTPUT SUBLAYER SET O CONTAINS AT LEAST ONE TEMPORAL SUBLAYER THAT IS A NON-OUTPUT SUBLAYER
1901

Figure 19

ENCODING A SYNTAX ELEMENT VALUE INTO A SYNTAX ELEMENT S FOR EACH TEMPORAL SUBLAYER THAT IS INCLUDED IN THE OUTPUT SUBLAYER SET O, WHERE THE SYNTAX ELEMENT S HAVING A FIRST VALUE SPECIFIES THAT THE TEMPORAL SUBLAYER IS AN OUTPUT SUBLAYER IN OUTPUT SUBLAYER SET O, AND THE SYNTAX ELEMENT S HAVING A SECOND VALUE DIFFERENT TO THE FIRST VALUE SPECIFIES THAT THE TEMPORAL SUBLAYER IS NOT AN OUTPUT SUBLAYER IN THE OUTPUT SUBLAYER SET O
2001

Figure 20

ENCODING, FOR EACH OF THE AT LEAST ONE OF THE N TEMPORAL SUBLAYERS, A PICTURE WIDTH VALUE W INTO THE BITSTREAM AND A PICTURE HEIGHT VALUE H INTO THE BITSTREAM, WHEREIN ALL PICTURES THAT BELONG TO A PARTICULAR TEMPORAL SUBLAYER HAVE A WIDTH EQUAL TO W AND A HEIGHT EQUAL TO H
2101

Figure 21

ENCODING, INTO THE BITSTREAM, FOR EACH OF THE AT LEAST ONE OF THE N TEMPORAL SUBLAYERS, A VIEW ID VALUE FOR THE TEMPORAL SUBLAYER
2201

Figure 22

ENCODING INFORMATION INDICATING THAT AT LEAST ONE TEMPORAL SUBLAYER OF THE AT LEAST ONE OF THE N TEMPORAL SUBLAYERS CONTAINS AUXILIARY PICTURES
2301

Figure 23

ENCODING INFORMATION INTO THE BITSTREAM INDICATING THAT A QUALITY OF THE FIRST TEMPORAL SUBLAYER IS HIGHER THAN A QUALITY OF THE SECOND TEMPORAL SUBLAYER
2401

Figure 24

TEMPORAL SUBLAYER INFORMATION FOR VIDEO CODING

CROSS REFERENCE TO RELATED APPLICATIONS

This application is a 35 U.S.C. § 371 national stage application of PCT International Application No. PCT/EP2022/059798 filed on Apr. 12, 2022, which in turn claims domestic priority to U.S. Provisional Patent Application No. 63/173,828, filed on Apr. 12, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

HEVC (High Efficiency Video Coding) and VVC (Versatile Video Coding)

High Efficiency Video Coding (HEVC) is a block-based video codec standardized by the ITU-T (Telecommunication Standardization Sector of the International Telecommunications Union) and the MPEG (Moving Pictures Expert Group) that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

Versatile Video Coding (VVC) is the successor of HEVC and a version 1 has been standardized by ITU-T and MPEG. Version 1 VVC is published as Rec. ITU-T H.266| ISO/IEC 23090-3, "Versatile Video Coding", 2020. VVC and HEVC are similar in many aspects.

NAL (Network Abstraction Layer) Units

Both HEVC and VVC define a Network Abstraction Layer (NAL). All the data, i.e. both Video Coding Layer (VCL) and non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC begins with a header which specifies the NAL unit type of the NAL unit that identifies what type of data is carried in the NAL unit, the layer ID and the Temporal ID for which the NAL unit belongs to. The NAL unit type is transmitted in the nal_unit_type codeword in the NAL unit header and the type indicates and defines how the NAL unit should be parsed and decoded. The rest of the bytes of the NAL unit is payload of the type indicated by the NAL unit type. A bitstream consists of a series of concatenated NAL units.

The syntax for the NAL unit header for HEVC is shown in Table 1.

TABLE 1

HEVC NAL unit header syntax

|  | Descriptor |
| --- | --- |
| nal_unit_header( ) { |  |
|   forbidden_zero_bit | f(1) |
|   nal_unit_type | u(6) |
|   nuh_layer_id | u(6) |
|   nuh_temporal_id_plus1 | u(3) |
| } |  |

The syntax for the NAL unit header in VVC version 1 is shown in Table 2.

TABLE 2

VVC NAL unit header syntax

|  | Descriptor |
| --- | --- |
| Nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

The decoding order is the order in which NAL units shall be decoded, which is the same as the order of the NAL units within the bitstream. The decoding order may be different from the output order, which is the order in which decoded pictures are to be output, such as for display, by the decoder.

Scalability Layers and the CLVS (Coded Layer Video Sequence)

The term "scalability layer" as used herein shall refer to scalability layers such as SNR, spatial, view scalability that in HEVC and VVC are identified by layer ID values such as nuh_layer_id values.

The value of the nuh_layer_id syntax element in the NAL unit header of HEVC and VVC specifies the scalability layer ID to which the NAL unit belongs to. Scalability layers may be coded independently or dependently from each other. When the scalability layers are coded independently, a scalability layer with e.g. nuh_layer_id 5 may not predict video data from another scalability layer with e.g. nuh_layer_id 2. Dependent coding between scalability layers enables support for scalable coding with signal-to-noise-ratio (SNR), spatial and view scalability. The dependency between layers is specified in the bitstream. An independent layer can alternatively be called base layer and a layer that depend on another layer is called an enhancement layer. The HEVC and VVC standards specify that enhancement layers must be discardable. This means that, e.g., if there is a bitstream with a base layer and one enhancement layer, the base layer is decodable if the enhancement layer information is discarded from the bitstream.

A layer access unit in VVC is defined as a set of NAL units for which the VCL NAL units all have a particular value of nuh_layer_id, that are associated with each other according to a specified classification rule, that are consecutive in decoding order, and that contain exactly one coded picture.

The relation between the layer access units and coded layer video sequences is illustrated in FIG. 1.

Temporal Sublayers

The term "temporal sublayer" or "sublayer" as used herein shall refer to temporal sublayers as used in HEVC and VVC. The term "layer" may refer to temporal sublayers, or scalability layers, or the combination of temporal sublayers and scalability layers.

In HEVC and VVC, the NAL unit has a nuh_temporal_id_plus1 syntax element and the TemporalId of the NAL unit is set to the value of nuh_temporal_id_plus1 minus 1. All VCL NAL units for one picture must have the same TemporalId value which then specifies what temporal sublayer the picture belongs to. A sublayer with TemporalId equal to x is said to be the x-th sublayer or sublayer x. The encoder is required to set TemporalId values such that pictures belonging to a lower temporal sublayer is perfectly decodable if higher temporal sublayers are discarded. Assume for instance that an encoder has output a bitstream using temporal sublayers 0, 1 and 2. Removing all temporal sublayer 2 NAL units or removing all temporal sublayer 1 and 2 NAL units will result in bitstreams that can be decoded without problems. This is ensured by restrictions in the HEVC and VVC specifications that the encoder must comply with. For instance, it is not allowed for a picture of a temporal sublayer to reference a picture of a higher temporal sublayer.

FIG. 2 contains nine pictures where each picture is associated with an output order value, a decoding order value and a TemporalId value. The nine pictures are output or displayed in the order from left to right, in increasing value of output order that is. The decoding order values shows the order in which the pictures are decoded. There are three temporal sublayers in the example, sublayer 0, 1 and 2. The sublayers are shown by the TemporalId values and the vertical position of each picture in the figure. The arrows show how different pictures reference other pictures. For instance, the picture with output order equal to 1 uses the pictures with output order equal to 0 and 2 for prediction. The figure shows that no picture of a lower TemporalId uses any picture of a higher TemporalId for prediction. That is an important rule since it enables removal of higher temporal sublayers without affecting the decodability of the remaining lower temporal sublayers. For instance, if temporal sublayer 2 were to be removed in the example above, temporal sublayers 0 and 1 would be decodable since no sublayer 2 picture is referenced by any sublayer 0 or 1 picture.

The letters "I" and "B" indicates picture types where "I" denotes an Intra picture and "B" denotes a bi-directional picture.

Intra random access point (IRAP) pictures and the coded video sequence (CVS).

For single scalability layer coding in HEVC, an access unit (AU) is the coded representation of a single picture. An AU may consist of several video coding layer (VCL) NAL units as well as non-VCL NAL units.

An intra random access point (IRAP) picture in HEVC is a picture that does not refer to any picture other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture, and the clean random access (CRA) picture.

A coded video sequence (CVS) in HEVC is a sequence of access units starting at an IRAP access unit followed by zero or more AUs up to, but not including, the next IRAP access unit in decoding order.

IDR pictures always start a new CVS. An IDR picture may have associated random access decodable leading (RADL) pictures. An IDR picture does not have associated random access skipped leading (RASL) pictures.

A BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may or may not start a CVS.

In VVC, there is additionally the gradual decoding refresh (GDR) picture which may or may not start a CVS without an Intra picture. A coded layer video sequence start (CLVSS) picture in VVC is an IRAP picture or a GDR picture. A CLVSS picture in VVC may start a VVC coded layer video sequence (CLVS) which is similar to a CVS in HEVC. There is no BLA picture type in VVC.

All IRAP pictures and the GDR picture must have TemporalId equal to 0. This means that a sublayer with TemporalId larger than 0 cannot be expressed to be independently decodable. One reason is that since all legal bitstreams must start with an IRAP or GDR picture, any bitstream where sublayer 0 has been discarded is non-conforming to the standard specification. Another reason is that HEVC and VVC are designed to guarantee that higher sublayers can be discarded and leave conforming bitstreams and NOT designed for discarding lower sublayers and leaving higher sublayers.

Decoding Capability Information (DCI)

In VVC there is a DCI NAL unit. The DCI specifies information that does not change during the decoding session and any such information should be provided to the decoder for the decoder to know about early and upfront, such as profile and level information. The information in the DCI is not necessary for operation of the decoding process. In drafts of the VVC specification, the DCI was called decoding parameter set (DPS).

The decoding capability information may also contain a set of general constraints for the bitstream, that gives the decoder information of what to expect from the bitstream, in terms of coding tools, types of NAL units, etc. In VVC version 1, the general constraint information can be signaled in the DCI, VPS or SPS.

The decoding capability information may also contain a set of general constraints for the bitstream, that gives the decoder information of what to expect from the bitstream, in terms of coding tools, types of NAL units, etc. In VVC version 1, the general constraint information can be signaled in the DCI, VPS or SPS.

Parameter Sets

HEVC and VVC specifies three types of parameter sets, the picture parameter set (PPS), the sequence parameter set (SPS), and the video parameter set (VPS). The PPS contains data that is common for a whole picture, the SPS contains data that is common for a coded video sequence (CVS), and the VPS contains data that is common for multiple CVSs, e.g. data for multiple layers in the bitstream.

The current version of VVC also specifies one additional parameter set, the adaptation parameter set (APS). The APS carries parameters needed for an adaptive loop filter (ALF) tool, a luma mapping and chroma scaling (LMCS) tool and a scaling list tool.

Both HEVC and VVC allows certain information (e.g. parameter sets) to be provided by external means. By "external means" should be interpreted as the information is not provided in the coded video bitstream but by some other means not specified in the video codec specification, e.g. via metadata possibly provided in a different data channel or as a constant in the decoder.

OLS (Output Layer Set) and OPI (Operation Point Information)

The VPS in VVC contains scalability layer information that is needed for handling scalable bitstreams. For VVC single-layer bitstreams, the VPS is optional so in those bitstreams the VPS may or may not be present. For HEVC, a VPS must be present for all bitstreams, even single-layer ones. The VPS defines output layer sets (OLS), where an OLS is a set of layers in the bitstream and indications of which of the layers in the OLS that should be output. In VVC, only the output layers are specified and the full OLS is derived by using bitstream information for how layers reference other layers. This means that the full OLS is decodable even if all layers that are not included in the OLS are discarded. In other word, no layer in an OLS depend on any layer not in the OLS. This also means that some OLS layers may be required to be decoded but no pictures of those layers are output.

The operation point information (OPI) in VVC can be used to specify the OLS index of the target OLS for the decoder to decode. The OPI may additionally specify the highest temporal sublayer the decoder should decode. When a bitstream contains many layers and sublayers, the OPI can be useful to tell a decoder what parts of the bitstream to decode and/or what temporal sublayers that should be discarded when decoding. The target OLS and highest temporal sublayer to decode can alternatively be specified by external means. If that happens and there is an OLS in the bitstream, the decoder should use the information provided by external means and ignore the OLS information. The OPI is signaled in its own non-VCL NAL unit in VVC.

Reference Picture Resampling (RPR)

RPR is a feature in VVC that does not exist in HEVC. In HEVC, all pictures of the same scalability layer have the same spatial resolution. In VVC however, pictures belonging to the same scalability layer could have different spatial resolutions. This means that single-layer bitstreams may contain pictures that have different spatial resolution. Pictures of the same sublayer in single-layer bitstream may also have different spatial resolutions. The spatial resolution (width and height) of a picture is signaled in the PPS in VVC. When the current picture and a reference picture have different spatial resolutions, RPR enables the reference picture to be used for prediction of the current picture by scaling the reference picture to the same spatial resolution as the current picture before prediction. This scaling is done on the block level.

Supplementary Enhancement Information (SEI) Messages

A bitstream may contain Supplementary Enhancement Information (SEI) message NAL units. These SEI messages do not influence the decoding process of coded pictures. Instead, SEI messages usually address issues of representation/rendering of the decoded pictures. The overall concept of SEI messages and many of the SEI messages themselves have been inherited from the H.264 and HEVC specifications into the VVC specification.

The SEI message syntax table describing the general structure of an SEI message in VVC is shown in Table 4.

TABLE 4

SEI message syntax table in VVC

| | Descriptor |
|---|---|
| sei_message( ) { | |
|   payloadType = 0 | |
|   do { | |
|     payload_type_byte | u(8) |
|     payloadType += payload_type_byte | |
|   } while( payload_type_byte = = 0xFF ) | |
|   payloadSize = 0 | |
|   do { | |
|     payload_size_byte | u(8) |
|     payloadSize += payload_size_byte | |
|   } while( payload_size_byte = = 0xFF ) | |
|   sei_payload( payloadType, payloadSize ) | |
| } | |

Annex D in the VVC specification specifies syntax and semantics for SEI message payloads for some SEI messages, and specifies the use of the SEI messages and VUI parameters for which the syntax and semantics are specified in the ITU-T VSEI standard (Rec. ITU-T H.274 ISO/IEC 23002-7)

SEI messages assist in processes related to decoding, display or other purposes. However, SEI messages are not required for constructing the luma or chroma samples by the decoding process. Some SEI messages are required for checking bitstream conformance and for output timing decoder conformance. A decoder is not required to support all SEI messages. Usually, if a decoder encounters an unsupported SEI message, it ignores the SEI message.

The VSEI specification specifies the syntax and semantics of most SEI messages and is mainly intended for use with VVC, although it is written in a manner intended to be sufficiently generic so that it may also be used with other video coding standards. As stated above, some selected SEI messages have its syntax and semantics specified in the main VVC specification and not in the VSEI specification.

The persistence of an SEI message indicates the pictures to which the values signalled in the instance of the SEI message may apply. The part of the bitstream that the values of the SEI message may apply to are referred to as the persistence scope of the SEI message.

Scalability Profiles

In HEVC and VVC, bitstreams conform to what is called profiles. The profile is a subset of the full feature set of a video coding standard which is useful since not all video applications need all features. When a video decoder is implemented, the profile or profiles to support is selected based on the applications that will use the decoder. Both HEVC and VVC have specified so-called "Main" profiles which are designed to address the requirements of the most commonly used video applications. Both HEVC and VVC have excluded scalability layer features from their Main profile and instead created separate profiles to support scalability layers. Since most implementations support the Main profile only, real-word support of scalability layers has been limited.

Moving Pictures Expert Group (MPEG) File Format

The ISO/IEC 14496-12 "ISO base media file format" developed by the MPEG systems subgroup has been around for over 20 years and is continuously being updated with new tools and functionalities. The main purpose of the ISO base media file format is to store and carry synchronized timed-based media, such as audio and video, and enable efficient search and playback. Media bitstreams are stored in a media data box whereas the logical structure of the file is stored separately as meta data in various functional boxes, entries and property units, carrying details on the media sequence, dependencies, and timing information. Supporting standards of the ISO file format family derives parts of the structure and functionalities of the ISO base media file format for their specifications. Examples of supporting standards include the ISO/IEC 14496-15 "Carriage of network abstraction layer (NAL) unit structured video in the ISO base media file format" that specifies storage and carriage of AVC, HEVC and VVC coded video data, the ISO/IEC 23008-12 "High Efficiency Image Format (HEIF)" that specifies storage and carriage of HEVC and VVC coded image data and the ISO/IEC-23009 "MPEG dynamic adaptive streaming over HTTP (MPEG-DASH)" that specifies sending media using adaptive streaming over HTTP. Currently MPEG is also working on file format support for new media types including volumetric video and point clouds as well as haptics for vibrations and other tactile inputs. The domain where these specifications are defined are sometimes referred to as the systems layer.

SUMMARY

Most HEVC decoders do not support scalability layers which means that they cannot be used for applications that require scalability. The uptake of the VVC profiles remain to be seen, but there is a high probability that the situation will be similar to HEVC with little support for scalability.

According to some embodiments, a method for determining one or more temporal sublayer properties from a bitstream includes determining, from the bitstream, a number N of temporal sublayers for which one or more temporal sublayer properties are specified. The method includes for each temporal sublayer of the N temporal sublayers having one or more temporal sublayer property values, decoding the one or more temporal sublayer property values from the bitstream wherein the one or more temporal sublayer property values comprises one or more of: sublayer referencing information; output sublayer set information; picture width and picture height per temporal sublayer information; sublayer multiview information; sublayer auxiliary information; and/or sublayer quality information.
Analogous Decoder and Computer Program Embodiments are Provided Advantages that can be achieved using the various embodiments of inventive concepts include enabling scalability in profiles that do no support scalability layers but do support temporal sublayers. The most implemented profiles are profiles that support temporal sublayers but not scalability layers. By using the various embodiments of inventive concepts, scalability can be used by these profiles, which enables using these profiles for a vast number of scalability use-cases.

According to some other embodiments a method for encoding one or more temporal sublayer properties into a bitstream includes determining a number N of temporal sublayers having one or more temporal sublayer property values to be encoded into the bitstream. The method includes for each temporal sublayer of the N temporal sublayers, encoding the one or more temporal sublayer property values into the bitstream wherein the one or more temporal sublayer property values comprises one or more of: sublayer referencing information; output sublayer set information; picture width and picture height per temporal sublayer information; sublayer multiview information; sublayer auxiliary information; and/or sublayer quality information.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 7-15 are flow charts illustrating operations of a decoder according to some embodiments of inventive concepts;

FIGS. 16-24 are flow charts illustrating operations of an encoder according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
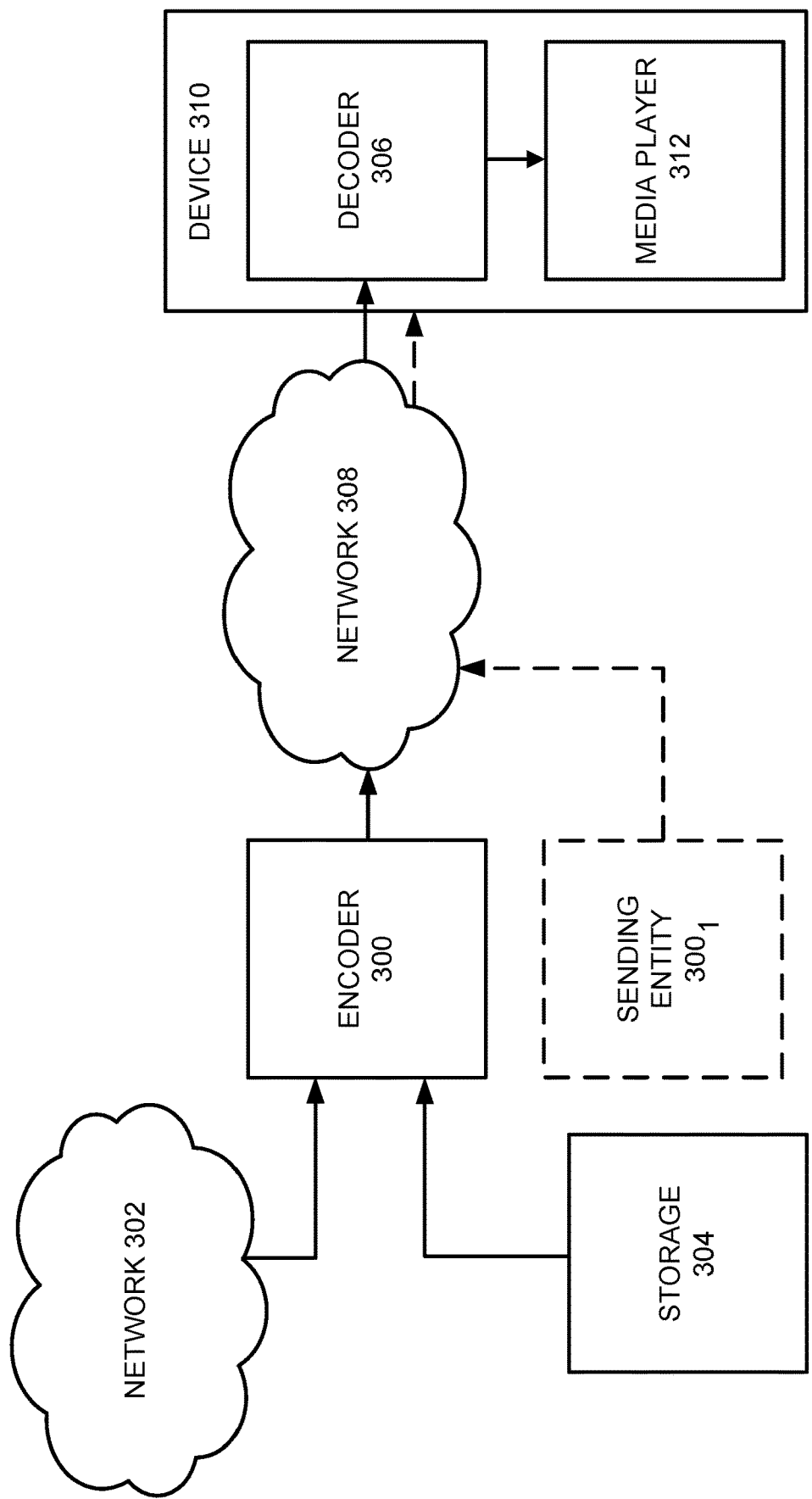
FIG. 3 is a block diagram illustrating an example of an environment of a system in which the encoder and decoder may be implemented according to some embodiments of inventive concepts.

Prior to describing the embodiments in further detail, FIG. 3 illustrates an example of an operating environment of an encoder 300 and decoder 306 that may be used to respectively encode and decode bitstreams as described herein. The encoder 300 receives video from network 302 and/or from storage 304 and encodes the video into bitstreams as described below and transmits the encoded video to decoder 306 via network 308. The encoder 300 in some embodiments may be part of a sending entity 300₁ that transmits the information for temporal sublayers. Storage device 304 may be part of a storage depository such as a storage repository of a store or a streaming video service, a separate storage component, a component of a mobile device, etc. The decoder 306 may be part of a device 310 having a media player 312. The device 310 may be a mobile device, a set-top device, a desktop computer, and the like.

As previously stated, most HEVC decoders do not support scalability layers which means that these HEVC decoders cannot be used for applications that require scalability. The uptake of the VVC profiles remain to be seen, but there is a high probability that the situation will be similar to HEVC with few deployed decoders that support use of scalability layers.

In various embodiments of inventive concepts, scalability use cases are supported using temporal sublayers as scalability layers. This is done in some embodiments by using temporal sublayers as scalability layers. Temporal sublayers are supported in the Main profiles of both HEVC and VVC. For VVC, spatial scalability is in the various inventive concepts done by using the reference picture resampling (RPR) feature of VVC in combination with temporal sublayers.

In some of the various embodiments of inventive concepts, a signalling system is used where key property values for each temporal sublayer is encoded into the bitstream, and every picture of a particular temporal sublayer is associated with the values for that particular temporal sublayer that are decoded from the bitstream. Thus, a decoder or another entity can decode key temporal sublayer property values from the bitstream and use that information to handle scalability, for example to correctly output an intended subset of the decoded pictures.

In some embodiments of inventive concepts, information is conveyed for temporal sublayers in a coded video bitstream. The information consists of syntax element values that is created by a first entity and read or decoded by a second entity. For example, the first entity may be a video encoder and the second entity may be a video decoder. The information for a particular temporal sublayer covers all pictures that belong to that particular temporal sublayer.

Advantages that can be achieved using the various embodiments of inventive concepts include enabling scalability in profiles that do no support scalability layers but do support temporal sublayers. The most implemented profiles are profiles that support temporal sublayers but not scalability layers. By using the various embodiments of inventive concepts, scalability can be used by these profiles, which enables using these profiles for a vast number of scalability use-cases.

Information for sublayers that currently exist in VVC include the following information for temporal sublayers:
 OLS (output layer set) timing and HRD (hypothetical reference decoder) parameters for temporal sublayers. Note here that the OLS is based on scalability layers and not on temporal sublayers as in the various embodiments of inventive concepts described herein. Only the timing parameters and HRD parameters are possible to convey per temporal sublayer.
 Profile, tier and level values for sublayers
 max_dec_pic_buffering_num_reorder_pics and max_latency_increase values for sublayers.

Other examples (see JVET-U0045) provide for:
 Decoding syntax element to control output of pictures that belong to a layer x, especially to decode an indication to NOT output layer x pictures using a non-output tsi_oss_output_sublayer_flag where these non-output flags can be used for spatial scalability and SNR scalability
 Decoding an indication whether the spatial resolution in each temporal sublayer is kept constant
 Decoding a temporal sublayer 0 with low resolution and a temporal sublayer 1 with high resolution and output only the temporal sublayer 1 pictures In the various embodiments of inventive concepts, information per temporal sublayer introduced for the first time include:
 Sublayer referencing information
  This information specifies how pictures of each sublayer reference pictures of other sublayers.
 Output sublayer set information
  The Output layer set (OLS) is known in video coding. However, in the embodiments of inventive concepts described herein, an Output sublayer set (OSS) which is a set of sublayers rather than scalability layers is provided.
 Picture width and picture height per temporal sublayer information
  The picture size is signaled for each sublayer.
 Sublayer multiview information and sublayer auxiliary information
  JVET-U2006 discloses signaling View ID values and Auxiliary ID values for scalability layers. Signaling similar values for temporal sublayers is provided.
 Sublayer quality information
  A quality value is signalled for each sublayer. This signaling provides an indication of the quality between different sublayers.

In the following various embodiments of inventive concepts, information for particular temporal sublayers is carried in the bitstream. The bitstream also contains coded pictures, where each picture is associated with a temporal sublayer. Information for a particular temporal sublayer is then associated with all pictures that belong to that particular temporal sublayer.

A particular temporal sublayer is identified by its temporal sublayer ID value, also referred to as the temporal ID value. A temporal sublayer with temporal ID value equal to x may be referred to as temporal sublayer x or sublayer x, where x is an integer such as 0, 1, 2, . . . . Each coded picture contains a syntax element that carries a temporal sublayer ID value. An example of such a syntax element is the nuh_temporal_id_plus1 syntax element in the HEVC and VVC specifications.

Figure 4:
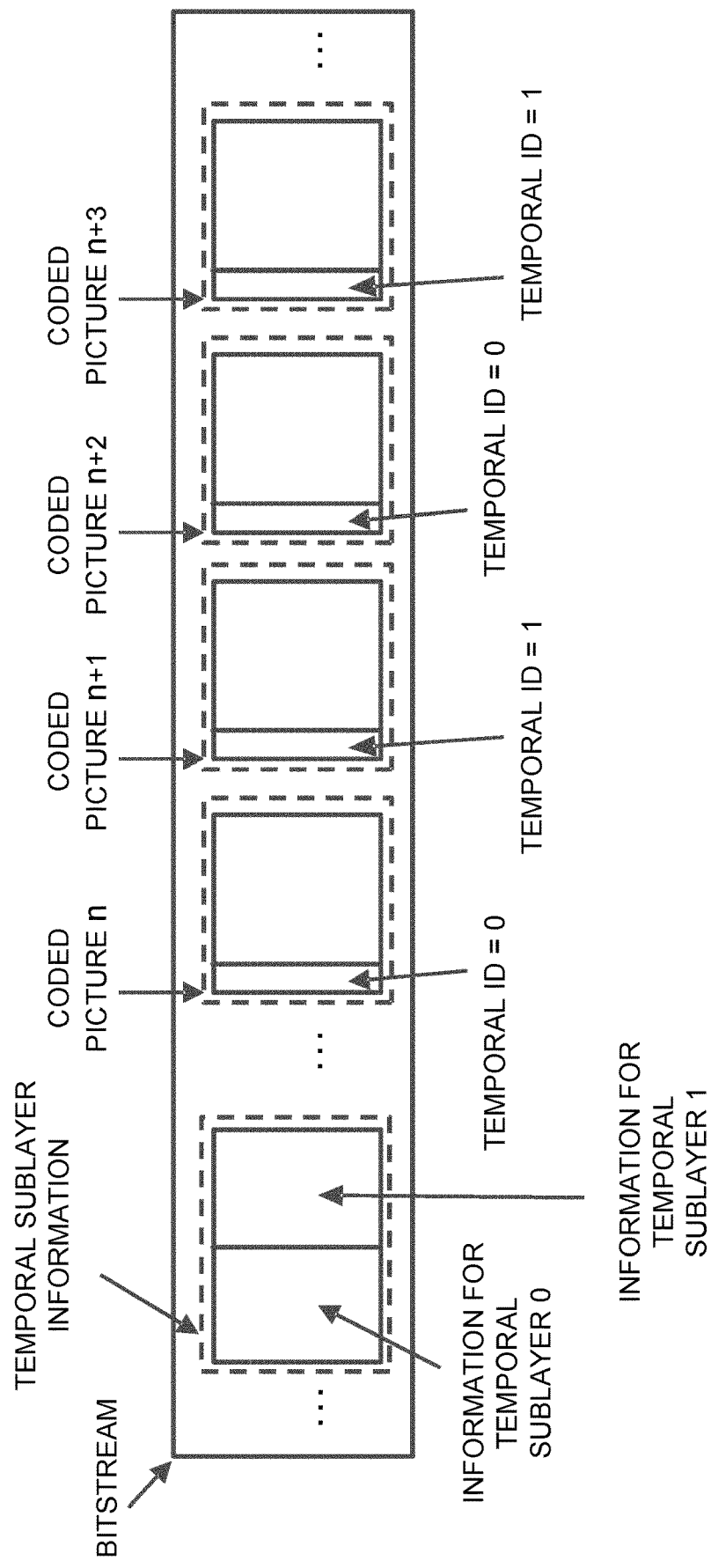
FIG. 4 is an example bitstream illustrating temporal sublayer information carried in a bitstream according to some embodiments of inventive concepts.

FIG. 4 illustrates an example bitstream. The example in the figure consists of a bitstream containing four coded pictures and temporal sublayer information for two temporal sublayers. Each coded picture has a temporal ID value and all pictures belonging to the same temporal sublayer share the information sent for that temporal sublayer. In the example in the figure, that means that the information for temporal sublayer 0 applies to coded pictures n and n+2, while the information for temporal sublayer 1 applies to coded pictures n+1 and n+3.

A decoder that decodes the example bitstream will first decode the temporal sublayer information and store the information for temporal sublayer 0 and temporal sublayer 1 separately. During decoding of a picture, the decoder will decode the temporal ID of the picture and use the information stored for that temporal ID value when decoding the picture or use the information after decoding depending on the information stored.

In one embodiment of inventive concepts, there is additionally a scalability layer ID value signaled for each picture. This means that both temporal ID and scalability layer ID is signaled for each picture, where the temporal ID and scalability layer ID are different IDs.

The temporal sublayer information can be decoded from a SEI message in the bitstream. Alternatively, the temporal sublayer information can be decoded from a parameter set in the bitstream or from a particular NAL unit in the bitstream. The temporal sublayer information may also be decoded from the systems layer of the bitstream, e.g. from an entry, box or property specified in the ISO/IEC 14496-12 "ISO Base Media File Format" or any derived specification such as ISO/IEC 14496-15 "Carriage of network abstraction layer (NAL) unit structured video in the ISO base media file format", ISO/IEC 23008-12 "High Efficiency Image Format (HEIF)" and the ISO/IEC-23009 "MPEG dynamic adaptive streaming over HTTP (MPEG-DASH)".

Embodiment 1—Sublayer Referencing Information

In this embodiment, signalling how pictures of each sublayer reference pictures of other sublayers is described. An example is shown using FIG. 2, which was used to explain temporal sublayers.

Figure 2:
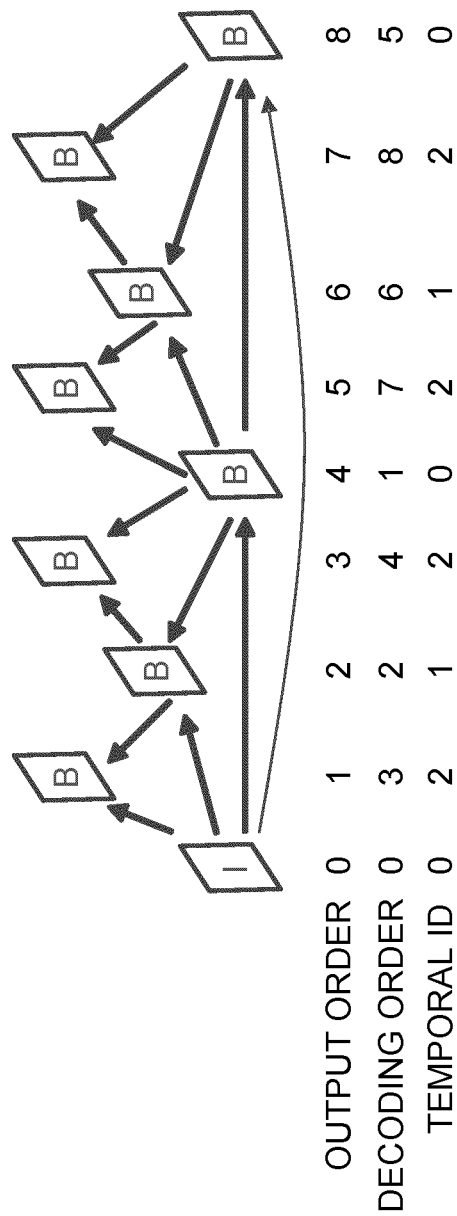
FIG. 2 is a diagram illustrating an example of temporal sublayers.

As illustrated in FIG. 2, sublayer 0 pictures reference other sublayer 0 pictures, but no other sublayer. Sublayer 0 pictures are the pictures for which Temporal ID is equal to 0. Note that in some video coding specifications, referencing a higher sublayer is not allowed. Sublayer 1 pictures reference only sublayer 0 pictures while sublayer 2 picture reference both sublayer 0 and 1 pictures.

The sublayer referencing information in this example can be illustrated by the table below. The "Yes" and "No" indicates whether the referencing sublayer is referencing the referenced sublayer or not. A "Yes" is used if there is any occurrence of the reference in question in the bitstream and a "No" is used only if there is no occurrence of that reference in the bitstream. The "-" is used for the cases where a lower sublayer would reference a higher sublayer, which is typically not allowed in video coding. The sublayer referencing information can thus be captured by six syntax elements, where the value of each syntax element specifies whether referencing between two particular sublayers is done anywhere in the bitstream or not.

| Referencing sublayer | Referenced sublayer | | |
| --- | --- | --- | --- |
| | 0 | 1 | 2 |
| 0 | Yes | — | — |
| 1 | Yes | No | — |
| 2 | Yes | Yes | No |

A decoder or another entity such as e.g. a network node or a server may perform the following steps for this embodiment:

1. Determine from the bitstream a number N of temporal sublayers for which one or more sublayer referencing information are specified. For the example illustrated in FIG. 2, the number N would be equal to 3 since the example contains sublayers 0, 1 and 2.
2. Decode sublayer referencing information by decoding a first set of syntax elements, where each syntax element value in the first set specifies whether or not a first temporal sublayer of the N number of sublayer is not a direct reference sublayer to a second temporal sublayer of the N number of sublayers.
3. Optional step: Derive sublayer referencing information in the form of a second set of syntax elements, where each syntax element in the second set of syntax elements specifies whether or not a third temporal sublayer of the N number of sublayer is not a direct or indirect reference sublayer to a fourth temporal sublayer of the N number of sublayers, wherein the derivation is based on the first set. (see dependencyFlag in the syntax and semantics example below)
4. Optional step: Use the sublayer referencing information to determine a set of temporal sublayers to discard from the bitstream and discard all pictures that belong to a temporal sublayer in the set of temporal sublayers from the bitstream In one embodiment of inventive concepts, the syntax elements would be decoded as follows, where num_sublayers is the number N of temporal sublayers and flag[i][j] is a 1-bit syntax element in the set of syntax elements and the value of flag[i][j] indicates whether or not temporal sublayer j is not a direct reference sublayer to temporal sublayer i:

```
for( i = 0; i < num_sublayers; i++ )
    for( j = 0; j <= i; j++ )
        flag[ i ][ j ]
```

In another embodiment, information on referencing within the sublayer is omitted as follows:

```
for( i = 0; i < num_sublayers; i++ )
    for( j = 0; j <i; j++ )
        flag[ i ][ j ]
```

In some embodiments of inventive concepts, a value of flag[i][j] equal to a first value indicates that there is no picture in the bitstream with TemporalId equal to j that is used as a reference picture for any picture in the bitstream with TemporalId equal to i while a value of flag[i][j] equal to a second value, different to the first value, does not impose such a constraint.

Note that the syntax elements in this embodiment may be 1-bit flags.

In the example of FIG. 2, six syntax elements or flags would be decoded to determine the referencing structure. The six syntax elements or flags correspond to the six possible referencing combinations of the example, and their values for the example is as follows:

| flag[i][j] | j = 0 | j = 1 | j = 2 |
| --- | --- | --- | --- |
| i = 0 | 1 | — | — |
| i = 1 | 1 | 0 | — |
| i = 2 | 1 | 1 | 0 |

Example syntax and semantics for this embodiment in a format suitable for adding the embodiment to the HEVC or VVC standard specification could look as follows:

| | Descriptor |
| --- | --- |
| tsi_max_sublayers_minus1 | u(3) |
| tsi_direct_ref_sublayer_info_present_flag | u(1) |

| | Descriptor |
|---|---|
| if(tsi_direct_ref_sublayer_info_present_flag) {<br>  for( i = 0; i <= tsi_max_sublayers_minus1; i++ )<br>    for( j = 0; j <= i; j++ )<br>      tsi_direct_ref_sublayer_flag[ i ][ j ]<br>} | u(1) | tsi_max_sublayers_minus1 plus 1 indicates the maximum number of temporal sublayers that may be present. The value of tsi_max_sublayers_minus1 shall be in the range of 0 to 6, inclusive.

tsi_direct_ref_sublayer_info_present_flag equal to 1 specifies that tsi_direct_ref_sublayer_flag[i][j] syntax elements are present. tsi_direct_ref_sublayer_info_present_flag equal to 0 specifies that tsi_direct_ref_sublayer_flag[i][j] syntax elements are not present.

tsi_direct_ref_sublayer_flag[i][j] equal to 0 indicates that there is no picture in the bitstream with TemporalId equal to j that is used as a reference picture for any picture in the bitstream with TemporalId equal to i. tsi_direct_ref_sublayer_flag[i][j] equal to 1 does not impose such a constraint.

When tsi_direct_ref_sublayer_info_present_flag is equal to 1, the variable dependencyFlag[i][j] is derived as follows:

```
for( i = 0; i <= tsi_max_sublayers_minus1; i++ ) {
    for( j = 0; j < i; j++ ) {
        dependencyFlag[ i ][ j ] = tsi_direct_ref_sublayer_flag[ i ][ j ]
        for( k = j+1; k < i; k++ )
            if( tsi_direct_ref_sublayer_flag[ i ][ k ] &&
            dependencyFlag[ k ][ j ] )
                dependencyFlag[ i ][ j ] = 1
    }
}
```

In another embodiment of inventive concepts, values of the syntax elements or flags that specify the referencing relation between the sublayers are signalled as a template relative to the lower sublayer and/or higher sublayers if the lower sublayer and/or the higher sublayers exist. In this embodiment, the referencing relation is defined in a relative way rather than an absolute way. In one example, the value of the flag[i][j] is defined equal to the value of the flag[i−1][j−1] when flag[i−1][j−1] exists. In another example, the value of the flag[i][j] is defined as the value of the flag[i−1][j] when flag[i−1][j] exists. In the following example, the values of flag[j][i] specify the referencing relation between sublayers using a relative template, where the values specify that there is no picture in the bitstream with TemporalId equal to j that is used as a reference picture for any of the pictures in the bitstream with TemporalId smaller than j.

| flag[i][j] | j = 0 | j = 1 | j = 2 | j = 3 |
|---|---|---|---|---|
| i = 0 | 1 | — | — | |
| i = 1 | f[i − 1][j] | 0 | — | |
| i = 2 | f[i − 1][j] | f[i − 1][j − 1] | f[i − 1][j − 1] | |
| i = 3 | f[i − 1][j] | f[i − 1][j − 1] | f[i − 1][j − 1] | f[i − 1][j − 1] |

Embodiment 2—Output Sublayer Sets

In this embodiment of inventive concepts, the concept of output sublayer sets (OSS) is described. The OSS is similar to the VVC output layer sets (OLSs) and describes output sets, but instead of basing them on layers as in VVC, they are based on sublayers. Each OSS consists of sublayers where each sublayer that is included in an OSS is either an output sublayer in the OSS or a non-output sublayer in the OSS.

Each OSS is independently decodable which means that the sublayers in an OSS have to be constructed in a way such that extraction of the temporal sublayers included in the OSS from the bitstream result in a decodable bitstream. In other words, no picture of any sublayer that is included in an OSS may use any picture of any sublayer that is not included in the OSS for reference.

A bitstream preferably includes two or more OSSs where none of the two or more OSSs contain the identical set of temporal sublayers.

In the VVC design, the output layer of an OLS is signaled and the full OLS is derived using direct reference layer information. For sublayers, a simpler design is proposed, using one flag to indicate inclusion of each sublayer in the OSS and one second flag to indicate whether the included sublayer is an output sublayer in the OSS or not. In another embodiment the output layer of an OSS is signaled, and the full OSS is derived using direct reference sublayer information, similar to how it is done for OLS in VVC.

In one embodiment of inventive concepts of embodiment 2, a syntax element for each temporal sublayer of the determined N number of temporal sublayers is decoded such that if the syntax element is equal to a first value, the temporal sublayer is included in the output sublayer set O. If the syntax element is equal to a second value different to the first value, the temporal sublayer is not included in the output sublayer set O. This embodiment may additionally contain decoding a syntax element S for each temporal sublayer that is included in the output sublayer set O, where the syntax element S having a first value specifies that the temporal sublayer is an output sublayer in output sublayer set O, and the syntax element S having a second value different to the first value specifies that the temporal sublayer is not an output sublayer in the output sublayer set O.

A decoder or another entity such as e.g. a network node or a multimedia application on a decoding device such as a mobile phone or TV-set may perform the following steps to decode a bitstream according to this embodiment:

1. Optional: Determine from the bitstream a number N of temporal sublayers in the bitstream.
2. Derive at least one output sublayer set by decoding a first set of syntax elements from the bitstream, wherein the at least one output sublayer set contains a non-empty set of temporal sublayer ID values
3. Decode one or more pictures from the bitstream and output the pictures that belong to a temporal sublayer that has a temporal sublayer ID value that is included in the output sublayer set, wherein no picture that belong to a temporal sublayer that has a temporal sublayer ID value that is not included in the output sublayer set is output. In one embodiment, at least one (but preferably all) picture that belong to a temporal sublayer that has a temporal sublayer ID value that is not included in the output sublayer set is discarded from the bitstream and thereby not decoded.

Alternatively, the decoder or another entity may perform the following steps to decode a bitstream according to this embodiment:

A. Optional: Determine from the bitstream a number N of temporal sublayers in the bitstream.

B. Derive at least one output sublayer set by decoding a first set of syntax elements from the bitstream, wherein the at least one output sublayer set contains a non-empty set of temporal sublayer ID values, wherein each temporal sublayer that has a temporal sublayer ID value that is included in the output sublayer set is determined to either be an output sublayer in the output sublayer set or a non-output sublayer in the output sublayer set C. Decode one or more pictures from the bitstream and output the pictures that belong to a temporal sublayer that has a temporal sublayer ID value that is included in the output sublayer set as an output sublayer in the output sublayer set, wherein no picture that belong to a temporal sublayer that has a temporal sublayer ID value that is either not included in the output sublayer set or is included in the output sublayer set as a non-output sublayer is output. In one embodiment, at least one (but preferably all) picture that belong to a temporal sublayer that has a temporal sublayer ID value that is not included in the output sublayer set is discarded from the bitstream and thereby not decoded.

In an example, the derivation in either of step 2 or step B above is done by decoding one syntax element for each temporal sublayer of the determined N number of temporal sublayers, where the syntax element having a first value specifies that the temporal sublayer is included in the output sublayer set, and the syntax element having a second value different to the first value specifies that the temporal sublayer is not included in the output sublayer set. Step B above may additionally include decoding a syntax element S for each temporal sublayer that is included in the output sublayer set O, where the syntax element S having a first value specifies that the temporal sublayer is an output sublayer in output sublayer set O, and the syntax element S having a second value different to the first value specifies that the temporal sublayer is not an output sublayer in the output sublayer set O.

In further examples of the steps A-C above, there is at least one picture that belongs to a temporal sublayer that is included in the output sublayer set as an output sublayer, and at least one picture that belongs to a temporal sublayer that is included in the output sublayer set as a non-output sublayer.

The output sublayer sets may alternatively be used by an entity to discard or prune temporal sublayers from a bitstream to either thereafter output the pruned bitstream or decode the pruned bitstream into one or more decoded pictures. Such an entity may perform the following steps to discard or prune temporal sublayers according to this embodiment:

1. Derive at least one output sublayer set by decoding a first set of syntax elements from the bitstream, wherein the at least one output sublayer set contains a non-empty set of temporal sublayer ID values
2. Determine for one or more packets or VCL NAL units in bitstream, the temporal ID of each one or more packets or VCL NAL units. This may be done by decoding a syntax element in the packet or VCL NAL unit carrying a temporal ID value. In the case of an HEVC or VVC bitstream, the temporal ID value is determined to be equal to the value of the nuh_temporal_id_plus1 syntax element of the VCL NAL unit header plus 1.
3. In response to determining that a packet or VCL NAL unit has a temporal ID value that is included in the at least one output sublayer set, output or decode the packet or VCL NAL unit
4. In response to determining that a packet or VCL NAL unit has a temporal ID value that is not included in the at least one output sublayer set, the packet or VCL NAL unit is discarded or not output or decoded Example syntax and semantics for this embodiment in a format suitable for adding the embodiment to the HEVC or VVC standard specification could look as follows:

| | Descriptor |
|---|---|
| tsi_max_sublayers_minus1 | u(3) |
| tsi_oss_info_present_flag | u(1) |
| if( tsi_oss_info_present_flag ) { | |
|     tsi_num_output_sublayer_sets_minus1 | u(4) |
|     for( i = 0; i <= tsi_num_output_sublayer_sets_minus1; i ++ ) { | |
|       for( j = 0; j <= tsi_max_sublayers_minus1; j++ ) { | |
|         if( j > 0 ) | |
|           tsi_oss_sublayer_flag[ i ][ j ] | u(1) |
|         if( tsi_oss_sublayer_flag[ i ][ j ] ) | |
|           tsi_oss_output_sublayer_flag[ i ][ j ] | u(1) |
|       } | |
|     } | |
|     tsi_oss_idx_plus1 | ue(v) |
|   } | |
| } | | tsi_max_sublayers_minus1 plus 1 indicates the maximum number of temporal sublayers that may be present in the bitstream. The value of tsi_max_sublayers_minus1 shall be in the range of 0 to 6, inclusive.

tsi_oss_info_present_flag equal to 1 specifies that OSS information is present. tss_oss_info_present_flag equal to 0 specifies that no OSS is specified.

tsi_num_output_sublayer_sets_minus1 plus 1 specifies the total number of specified OSSs. When not present, tsi_num_output_sublayer_sets_minus1 is inferred to be equal to 0.

tsi_oss_sublayer_flag[i][j] equal to 1 specifies that temporal sublayer j is included in the i-th OSS. tsi_oss_sublayer_flag[i][j] equal to 0 specifies that temporal sublayer j is not included in the i-th OSS. When not present and tsi_oss_info_present_flag is equal to 1 and i is in the range of 0 to tsi_num_output_sublayer_sets_minus1, inclusive, tsi_oss_sublayer_flag[i][0] is inferred to be equal to 1.

When tsi_oss_info_present_flag is equal to 1, each temporal sublayer shall be included in at least one OSS. In other words: When tsi_oss_info_present_flag is equal to 1, then for any value j, in the range of 0 to tsi_max_sublayers_minus1, inclusive, there shall be a value i in the range of 0 to tsi_num_output_sublayer_sets_minus1, inclusive, for which tsi_oss_sublayer_flag[i][j] is equal to 1.

The bitstream shall be designed such that, for each specified OSS, discarding all temporal sublayers that are not included in the OSS would result in a conforming bitstream.

If tsi_direct_ref_sublayer_info_present_flag and tsi_oss_info_present_flag are both equal to 1 and the i-th OSS includes the j-th temporal sublayer, the i-th OSS shall also include all temporal sublayers k for which dependencyFlag[j][k] is equal to 1.

tsi_oss_output_sublayer_flag[i][j] equal to 1 specifies that temporal sublayer j is an output sublayer of the i-th OSS. tsi_oss_output_sublayer_flag[i][j] equal to 0 specifies that temporal sublayer j is not an output sublayer of the i-th OSS. When not present, the value of tsi_oss_output_sublayer_flag [i][j] is inferred to be equal to 0.

For each OSS, there shall be at least one temporal sublayer that is an output sublayer. In other words: When tsi_oss_info_present_flag is equal to 1, then for any value of i in the range of 0 to tsi_num_output_sublayer_sets_minus1, inclusive, there shall be a value j in the range of 0 to tsi_max_sublayers_minus1, inclusive, such that tsi_oss_output_sublayer_flag[i][j] is equal to 1. tsi_oss_idx_plus1 minus 1 indicates a preferred OSS in the bitstream. tsi_oss_idx_plus1 equal to 0 indicates that no OSS in the bitstream is indicated to be a preferred OSS.

When tsi_oss_idx_plus1 is larger than 0, a system may choose to output only the pictures that belong to a temporal sublayer j for which tsi_oss_output_sublayer_flag[tsi_oss_idx_plus1−1][j] is equal to 1. The value of tsi_oss_idx_plus1 shall not be greater than tsi_num_output_sublayer_sets_minus1+1.

Embodiment 3—The Target Output Sublayer Set

In this embodiment of various inventive concepts, one output sublayer set is determined to be the target output sublayer set T. (The target output sublayer set T may contain at least one temporal sublayer that is an output sublayer in the target sublayer set T and at least one temporal sublayer that is a non-output sublayer in the target sublayer set T.)

The decoder may determine the target output sublayer set T by decoding an index value from a syntax element in the bitstream where an index value equal to i means that the i-th output sublayer set is determined to be the target sublayer set. Alternatively, the decoder may determine the target output sublayer set by external means.

In one embodiment, one value of the target output sublayer syntax element specifies that there is no target output sublayer set specified in the bitstream. In another embodiment, the target output sublayer syntax element is optional and if it is not present in the bitstream, the decoder determines that there is no target output sublayer set specified in the bitstream. Alternatively, the decoder determines that the highest output sublayer set is the target output sublayer set when the syntax element is not present. The highest output sublayer set may be the output sublayer set that is signaled first or last in the bitstream.

When the target sublayer set has been determined, the decoder may decode, from the bitstream, the pictures that belong to the target output sublayer set T and output the pictures from the temporal sublayers that are determined to be output sublayers in the target output sublayer set T. The decoder should not output any picture from temporal sublayers that are either not included in the target output sublayer set T or included in the target output sublayer set T but determined to be a non-output sublayer.

As an example using output sublayer sets for providing spatial scalability where one bitstream provides two representations: one base sublayer representation of HD resolution and one enhancement sublayer representation of 4K resolution. In this example, the base sublayer representation uses TemporalId equal to 0 and the enhancement sublayer representation uses TemporalId equal to 1. A first output sublayer set signaled in the bitstream may then contain TemporalId equal to 0 as an output sublayer in the sublayer set. A second output sublayer set may contain TemporalId equal to 0 as a non-output sublayer and TemporalId equal to 1 as an output sublayer.

To decode and output the base sublayer representation, the target sublayer set is set to the first output sublayer set, for example by including a target output sublayer syntax element in the bitstream that indicates that the target sublayer set is the first output sublayer set. A decoder will then decode the output sublayer set information and the target output sublayer syntax element and decode and output the base sublayer only.

To decode and output the enhancement sublayer representation, the target sublayer set is set to the second output sublayer set. A decoder will then decode the output sublayer set information and the target output sublayer syntax element and decode and output the enhancement sublayer. The decoder may decode both the sublayers with TemporalId equal to 0 and 1 since they are both included in the second output sublayer set, but only output the pictures with TemporalId equal to 1 since that is the only sublayer that is an output sublayer in the second output sublayer set.

A decoder or another entity such as e.g. a network node or a multimedia application on a decoding device such as a mobile phone or TV-set may perform the following steps to decode a bitstream according to this embodiment:

1. Derive at least two output sublayer sets by decoding a first set of syntax elements from the bitstream, wherein the at least two output sublayer sets both contains a non-empty set of temporal sublayer ID values
2. Determine one of the at least two output sublayer sets to be the target output sublayer set T. This could be done by decoding an index value from a syntax element in the bitstream where an index value equal to i means that the i-th output sublayer set is determined to be the target sublayer set T.
3. Decode one or more pictures from the bitstream and output the pictures that belong to a temporal sublayer that has a temporal sublayer ID value that is included in the target output sublayer set T, wherein no picture that belong to a temporal sublayer that has a temporal sublayer ID value that is not included in the target output sublayer set T is output. In one embodiment, at least one (but preferably all) picture that belong to a temporal sublayer that has a temporal sublayer ID value that is not included in the target output sublayer set T is discarded from the bitstream and thereby not decoded.

In one version of the embodiment, step 2 additionally includes deriving the at least two output sublayer sets wherein each temporal sublayer that has a temporal sublayer ID value that is included in any of the at least two output sublayer sets is determined to either be an output sublayer in its output sublayer set or a non-output sublayer in its output sublayer set. In this one version, step 3 above may be replaced by: "3) Decode one or more pictures from the bitstream and output the pictures that belong to a temporal sublayer that has a temporal sublayer ID value that is included in the target output sublayer set T as an output sublayer in the target output sublayer set T, wherein no picture that belong to a temporal sublayer that has a temporal sublayer ID value that is either not included in the target output sublayer set T or is included in the target output sublayer set T as a non-output sublayer is output. In one embodiment, at least one (but preferably all) picture that belong to a temporal sublayer that has a temporal sublayer ID value that is not included in the target output sublayer set T is discarded from the bitstream and thereby not decoded."

Example syntax and semantics for this embodiment is given above, see the syntax and semantics of the tsi_oss_idx_plus1 syntax element.

Embodiment 4—Picture Width and Height

In this embodiment of various inventive concepts, the decoder decodes, for each temporal sublayer of the determined N number of temporal sublayers, a picture width value W from the bitstream and a picture height value H from the bitstream, where all pictures that belong to a particular temporal sublayer S have a width equal to the value W and a height equal to the value H that were stored and associated with the same temporal sublayer S.

For example, assume that the decoder determines that there are 2 temporal sublayers in the bitstream. This might be determined by decoding the value 2 from a syntax element representing the number of sublayers. Then for the first temporal sublayer, a picture width value of 1920 and a picture height value of 1080 may be decoded followed by a picture width value of 3840 and a picture height value of 2160 for the second temporal sublayer. This would specify that all pictures that belong to the first temporal sublayer has a size of 1920×1080 samples and that all pictures that belong to the second temporal sublayer has a size of 3840×2160 samples.

In one embodiment the picture width and height values are output picture width and height values. This means that the picture size during decoding might be different to the output picture size, but when the decoder outputs a picture and the picture size is not equal to the output picture size, the picture is cropped or resized to be equal to the output picture width and height. In this case the picture size during decoding may vary within a temporal sublayer, but the output picture size is always the same.

In yet another embodiment, the picture width and height values are maximum picture width and height values. This means that the picture size may be equal to or smaller than the maximum size, but that it is guaranteed that the picture size is not larger than the maximum picture size.

A decoder or another entity such as e.g. a network node or a multimedia application on a decoding device such as a mobile phone or TV-set may perform the following steps to decode a bitstream according to this embodiment:
1. Determine from the bitstream a number N of temporal sublayers for which width and height information is specified.
2. For each temporal sublayer S in the bitstream, determine a picture width value Ws from the bitstream and a picture height value Hs from the bitstream
3. Determine that all pictures in the bitstream that belong to temporal sublayer S have a picture width that is equal to Ws and a picture height that is equal to Hs. In an alternative version it is determined that all pictures in the bitstream that belong to temporal sublayer S have a picture width that is less or equal to Ws and a picture height that is less or equal to Hs In one version, the picture width value Ws is an output picture width value and the picture height value Hs is an output picture height value. This means that the width and height of any outputted picture that belong to temporal sublayer S is equal to Ws and Hs. In another version, the picture width value Ws is a maximum picture width value and the picture height value Hs is a maximum picture height value. This means that the maximum width and height of any picture that belong to temporal sublayer S is equal to Ws and Hs.

In yet another version of this embodiment, the picture width and height values are not associated with temporal sublayers but associated with output sublayer sets. This means that the width and height values are signaled for each specified output sublayer set in the bitstream and that the pictures of each output sublayer set have identical picture width and height. This may apply to output pictures of the output sublayer sets only, such that the width and height of all pictures in an output layer set that are output have a width and height equal to the width and height specified for that output sublayer set.

A decoder or another entity such as e.g. a network node or a multimedia application on a decoding device such as a mobile phone or TV-set may perform the following steps to decode a bitstream according to this embodiment:
1. Derive at least one output sublayer set by decoding a first set of syntax elements from the bitstream, wherein the at least one output sublayer set contains a non-empty set of temporal sublayer ID values
2. For each at least one output sublayer set S, derive a picture width value Ws from the bitstream and a picture height value Hs from the bitstream
3. Decode one or more pictures from the bitstream and output the pictures that belong to a temporal sublayer that has a temporal sublayer ID value that is included in the output sublayer set, wherein no picture that belong to a temporal sublayer that has a temporal sublayer ID value that is not included in the output sublayer set is output and wherein the width and height of the pictures that are output is equal to Ws and Hs Example syntax and semantics for this embodiment where width and height is associated with temporal sublayers in a format suitable for adding the embodiment to the HEVC or VVC standard specification could look as follows:

|  | Descriptor |
|---|---|
| tsi_max_sublayers_minus1 | u(3) |
| tsi_sublayer_spatial_scalability_info_flag | u(1) |
| if (tsi_sublayer_spatial_scalability_info_flag) { |  |
|   for( i = 0; i <= tsi_max_sublayers_minus1; i++ ) { |  |
|     tsi_pic_output_width_in_luma_samples[ i ] | ue(v) |
|     tsi_pic_output_height_in_luma_samples[ i ] | ue(v) |
|   } |  |
| } |  | tsi_max_sublayers_minus1 plus 1 indicates the maximum number of temporal sublayers that may be present in the bitstream. The value of tsi_max_sublayers_minus1 shall be in the range of 0 to 6, inclusive.

tsi_sublayer_spatial_scalability_info_flag equal to 1 indicates that the bitstream may be a spatial scalability bitstream using temporal sublayers. When equal to 1, the intended picture output width and height for each temporal sublayer is indicated. tsi_sublayer_spatial_scalability_info_flag equal to 0 indicates that bitstream is not a spatial scalability bitstream using temporal sublayers.

NOTE—Practical spatial scalability using temporal sublayers requires support of using different spatial picture sizes for different temporal sublayers. VVC supports this by reference picture resampling.

tsi_pic_output_width_in_luma_samples[i] and tsi_pic_output_height_in_luma_samples[i] specifies an intended picture output size for all pictures within the bitstream that belong the i-th temporal sublayer.

Embodiment 5—Sublayer Multiview Information

In this embodiment of inventive concepts, information is introduced for each temporal sublayer containing whether the temporal sublayer is a multiview temporal sublayer and if so a View ID value for the temporal sublayer.

The bitstream in this embodiment contains a flag or flags, either one common flag for all temporal sublayers or one individual flag for each temporal sublayer. If a common flag is used, the flag specifies whether all temporal sublayers are multiview sublayers or no temporal sublayer is a multiview sublayer. If all temporal sublayers are multiview sublayers, there is a view id syntax element for each temporal sublayer that can be decoded to a view id value for the sublayer. If individual flags are used, each flag specifies whether that particular sublayer is a multiview sublayer or not and if the flag specifies that the sublayer is a multiview sublayer, there is a view id syntax element for that sublayer that can be decoded to a view id value for the sublayer.

A decoder or another entity such as e.g. a network node or a multimedia application on a decoding device such as a mobile phone or TV-set may perform the following steps to decode a bitstream according to this embodiment:
1. Determine from the bitstream a number N of temporal sublayers for which multiview information is specified.
2. For each temporal sublayer S in the bitstream, determine a View ID value V from the bitstream
3. Determine that all pictures in the bitstream that belong to temporal sublayer S have a view ID value equal to V Embodiment 6—Sublayer Auxiliary Information In this embodiment of various inventive concepts, information is introduced for each temporal sublayer containing whether the temporal sublayer contains auxiliary pictures.

Like the previous embodiment 5, either a common flag or individual flags can be used. If a common flag is used, the flag specifies whether all temporal sublayers contain auxiliary pictures or no temporal sublayer contain auxiliary pictures. If all temporal sublayers contain auxiliary pictures, there is an auxiliary picture id syntax element for each temporal sublayer that can be decoded to auxiliary picture id value for the sublayer. If individual flags are used, each flag specifies whether that particular sublayer contain auxiliary pictures or not and if the flag specifies that the sublayer contain auxiliary pictures, there is an auxiliary picture id syntax element for that sublayer that can be decoded to an auxiliary picture id value for the sublayer In one embodiment of inventive concepts, one auxiliary picture id value means that the auxiliary pictures that belong to that sublayer are alpha plane pictures.

In another embodiment of inventive concepts, one auxiliary picture id value means that the auxiliary pictures that belong to that sublayer are depth pictures.

In a further embodiment of inventive concepts, a flag specifies whether all temporal sublayers contain alpha plane pictures or no temporal sublayer contain alpha plane pictures. In another embodiment, a flag specifies whether any temporal sublayers may contain an alpha plane picture or that no temporal sublayer contains an alpha plane picture.

In yet another embodiment of inventive concepts, a flag specifies whether all temporal sublayers contain depth pictures or no temporal sublayer contain depth pictures. In another embodiment, a flag specifies whether any temporal sublayers may contain a depth picture or that no temporal sublayer contains a depth picture.

Embodiment 7—Sublayer Quality Information

In this embodiment of various inventive concepts, the decoder decodes, for each temporal sublayer of the determined N number of temporal sublayers, a quality value that specifies or indicates a quality or relative quality for the pictures of the sublayer.

When SNR scalability is used using temporal sublayers, the quality value may be used to indicate the picture quality of each sublayer, in particular the relative picture quality of the N temporal sublayers.

In a first version of this embodiment, the quality value indicates a quality ranking of the current temporal sublayer in relation to the other temporal sublayers. For instance, the temporal sublayer with highest picture quality, has the quality value 0, the temporal sublayer with the second highest picture quality has the quality value 1, and so on until the temporal sublayer with the worst picture quality has the quality value N−1. If temporal sublayers have the same picture quality, they may share the same quality value.

In a second version of this embodiment, the quality value indicates an absolute picture quality of each sublayer. The absolute value may be a value on a scale from a min value to a max value. The absolute value may represent the quantization parameter (QP) value or represent any metric such as PSNR (peak signal-to-noise ratio), VMAF (video multi-method assessment fusion), SSIM (structural similarity index measure), or MS-SSIM (multi-scale SSIM). The absolute value may represent the average QP or metric value across all pictures of the temporal sublayer.

A flag may be used to specify whether sublayer quality information is provided with the temporal sublayer information or not.

Figure 1:
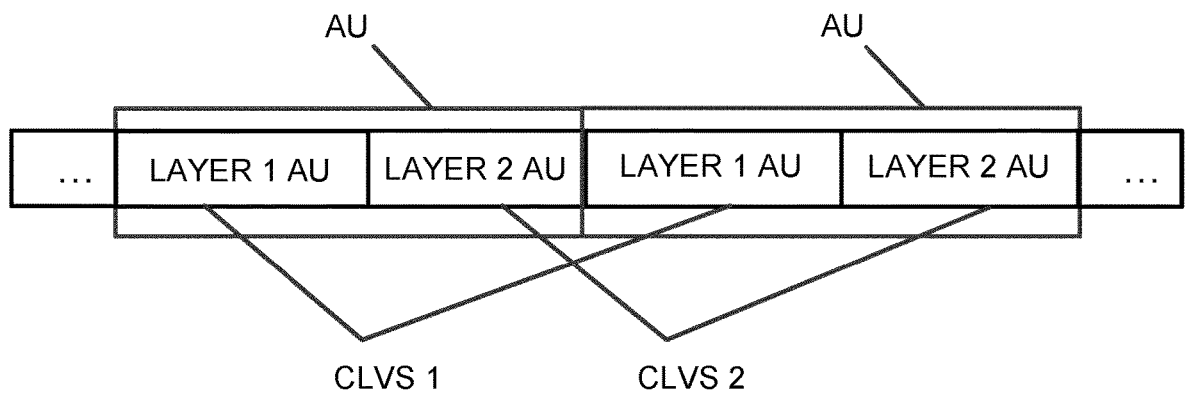
FIG. 1 is a diagram illustrating the relation between layer access units (AUs), and coded layer sequences (CLVSs)
Figure 5:
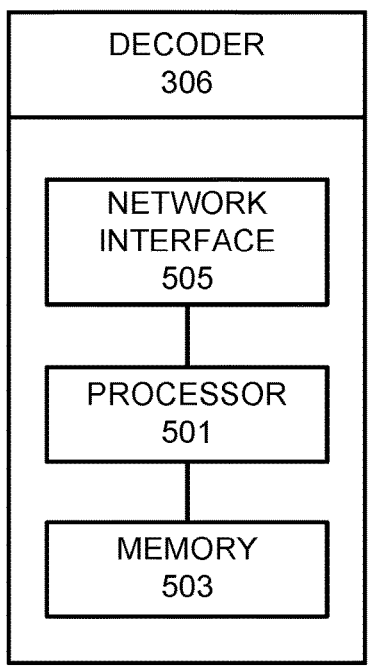
FIG. 5 is a block diagram illustrating a decoder according to some embodiments of inventive concepts.

FIG. 5 is a block diagram illustrating elements of a decoder 306 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to decode and determine one or more temporal sublayer properties from a bitstream according to some embodiments of inventive concepts. As shown, decoder 306 may include a network interface circuit 505 (also referred to as a network interface) configured to provide communications with other devices/entities/functions/etc. The decoder 306 may also include a processor circuit 501 (also referred to as a processor) coupled to the network interface circuit 505, and a memory circuit 503 (also referred to as memory) coupled to the processor circuit. The memory circuit 503 may include computer readable program code that when executed by the processor circuit 501 causes the processor circuit to perform operations according to embodiments disclosed herein.

According to other embodiments, processor circuit 501 may be defined to include memory so that a separate memory circuit is not required. As discussed herein, operations of the decoder 306 may be performed by processor 501 and/or network interface 505. For example, processor 501 may control network interface 505 to receive communications from encoder 300. Moreover, modules may be stored in memory 503, and these modules may provide instructions so that when instructions of a module are executed by processor 501, processor 501 performs respective operations and/or causes the decoder 306 or other nodes/functions to perform respective operations. According to some embodiments, a decoder 306 and/or an element(s)/function(s) thereof may be embodied as a virtual node/nodes and/or a virtual machine/machines.

Figure 6:
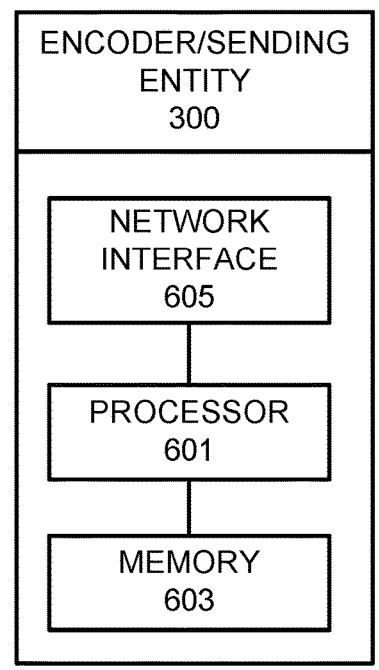
FIG. 6 is a block diagram illustrating an encoder/sending entity according to some embodiments of inventive concepts.

FIG. 6 is a block diagram illustrating elements of encoder 300 configured to encode video frames according to some embodiments of inventive concepts. As shown, encoder 300 may include a network interface circuit 605 (also referred to as a network interface) configured to provide communications with other devices/entities/functions/etc. The encoder 300 may also include a processor circuit 601 (also referred to as a processor) coupled to the network interface circuit 605, and a memory circuit 603 (also referred to as memory) coupled to the processor circuit. The memory circuit 603 may include computer readable program code that when executed by the processor circuit 601 causes the processor circuit to perform operations according to embodiments disclosed herein.

According to other embodiments, processor circuit 601 may be defined to include memory so that a separate memory circuit is not required. As discussed herein, operations of the encoder 300 may be performed by processor 601 and/or network interface 605. For example, processor 601 may control network interface 605 to transmit communications to decoder 306 and/or to receive communications through network interface 605 from one or more other network nodes/entities/servers such as other encoder nodes, depository servers, etc. Moreover, modules may be stored in memory 603, and these modules may provide instructions so that when instructions of a module are executed by processor 601, processor 601 performs respective operations. According to some embodiments, an encoder 300 and/or an element(s)/function(s) thereof may be embodied as a virtual node/nodes and/or a virtual machine/machines.

In the description that follows, operations of the decoder 306 (implemented using the structure of the block diagram of FIG. 5) will now be discussed with reference to the flow chart of FIG. 7 according to some embodiments of inventive concepts. For example, modules may be stored in memory 503 of FIG. 5, and these modules may provide instructions so that when the instructions of a module are executed by respective decoder processing circuitry 501, processing circuitry 501 performs respective operations of the flow chart. Note that when the decoder 306 is distributed across various entities, the processor 501, in the decoding operations described below may, in decoding may direct one or more of the various entities to perform decoding operations. Thus, the processor 501 decodes information by initiating one or more of the various entities to perform decoding operations. In other words, the processor 501 initiates decoding. Thus, in the description below, decoding includes initiating decoding.

FIG. 7 illustrates a method for determining one or more temporal sublayer properties from a bitstream. Turning to FIG. 7, in block 701, the processing circuitry 501 determines, from the bitstream, a number N of temporal sublayers for which one or more temporal sublayer properties are specified. As described above, N is the number of temporal sublayers for which temporal sublayer properties are specified. The temporal sublayer ID's covered are 0, 1, . . . , N−1. The bitstream may contain fewer or more temporal sublayers which means that, e.g., there may be no picture of temporal sublayer N−2 in the bitstream but there may be a picture of temporal sublayer N+1 in the bitstream.

In block 703, the processing circuitry 501, for each temporal sublayer of the N temporal sublayers having one or more temporal sublayer property values, decodes the one or more temporal sublayer property values from the bitstream wherein the one or more temporal sublayer property values comprises one or more of:
  sublayer referencing information;
  output sublayer set information;
  picture width and picture height per temporal sublayer information;
  sublayer multiview information;
  sublayer auxiliary information; and/or
  sublayer quality information.

In block 705, the processing circuitry 501 decodes a picture from the bitstream based on the one or more temporal sublayer property values of at least one temporal sublayer. For example, when there are three temporal sublayers, the processing circuitry 501 decodes the picture based on the one or more temporal sublayer property values of the three temporal sublayers.

Various operations from the flow chart of FIG. 7 may be optional with respect to some embodiments of decoders and related methods. Regarding methods of example embodiment 1 (set forth below), for example, operations of block 705 of FIG. 7 may be optional.

FIG. 8 illustrates an embodiment of inventive concepts where the one or more temporal sublayer property values comprises the sublayer referencing information for at least one of the N temporal sublayers.

Turning to FIG. 8, in block 801, the processing circuitry 501 decodes a set of syntax elements into a set of syntax element values wherein each first syntax element value in the set of syntax element values specifies whether or not a first temporal sublayer of the N number of temporal sublayers is not a direct reference sublayer to a second temporal sublayer of the N number of temporal sublayers. The second temporal sublayer in some embodiments may always belong to the same or a higher temporal sublayer than the first temporal sublayer.

In some embodiments of inventive concepts, the processing circuitry 501, can decode the set of syntax elements in accordance with

```
for( i = 0; i < num_sublayers; i++ )
  for( j = 0; j < i; j++ )
    flag[ i ][ j ]
``` where num_sublayers is the number N of temporal sublayers and flag[i][j] is a syntax element in the set of syntax elements and the value of flag[i][j] indicates whether or not temporal sublayer j is not a direct reference sublayer to temporal sublayer i. In some of these embodiments of inventive concepts, j<i includes when j=i, such that "for (j=0;j<i;j++)" above is replaced by "for (j=0;j<=i;j++)".

In various embodiments, one value of a first syntax element indicates that there is no picture belonging to the first temporal sublayer in the bitstream that is used as a reference picture for any picture belonging to the second temporal sublayer in the bitstream.

FIG. 9 illustrates an embodiment of inventive concepts where the one or more temporal sublayer property values comprises the output sublayer set information for at least one of the N temporal sublayers.

Turning to FIG. 9, in block 901, the processing circuitry 501 determines at least one output sublayer set O comprising temporal sublayers by decoding a first set of syntax elements from the bitstream. This may be done by decoding the bitstream to determine the at least one output sublayer set O comprising temporal sublayers.

In block 903, the processing circuitry 501 decodes one or more pictures from the bitstream and outputs pictures that are included in temporal sublayers that are included in the at least one output sublayer set O.

In some embodiments of inventive concepts, the processing circuitry 501 obtains two or more output sublayer sets from the bitstream, wherein none of the two or more output sublayer sets contains an identical set of temporal sublayers.

FIG. 10 illustrates an embodiment of inventive concepts where only temporal sublayers that are included in the at least one output sublayer set O are output.

Turning to FIG. 10, in block 1001, the processing circuitry 501 determines from the bitstream, for each temporal sublayer in the output sublayer set O, whether the temporal sublayer is an output sublayer in the output sublayer set O or is a non-output sublayer in the output sublayer set O, wherein the output sublayer set O contains at least one temporal sublayer that is an output sublayer and wherein the output sublayer set O contains at least one temporal sublayer that is a non-output sublayer.

In block 1003, the processing circuitry 501 outputs only temporal sublayers that are included in the at least one output sublayer set O and determined from the bitstream to be an output sublayer in the output sublayer set O.

Figures 11, 12, 13, 14:
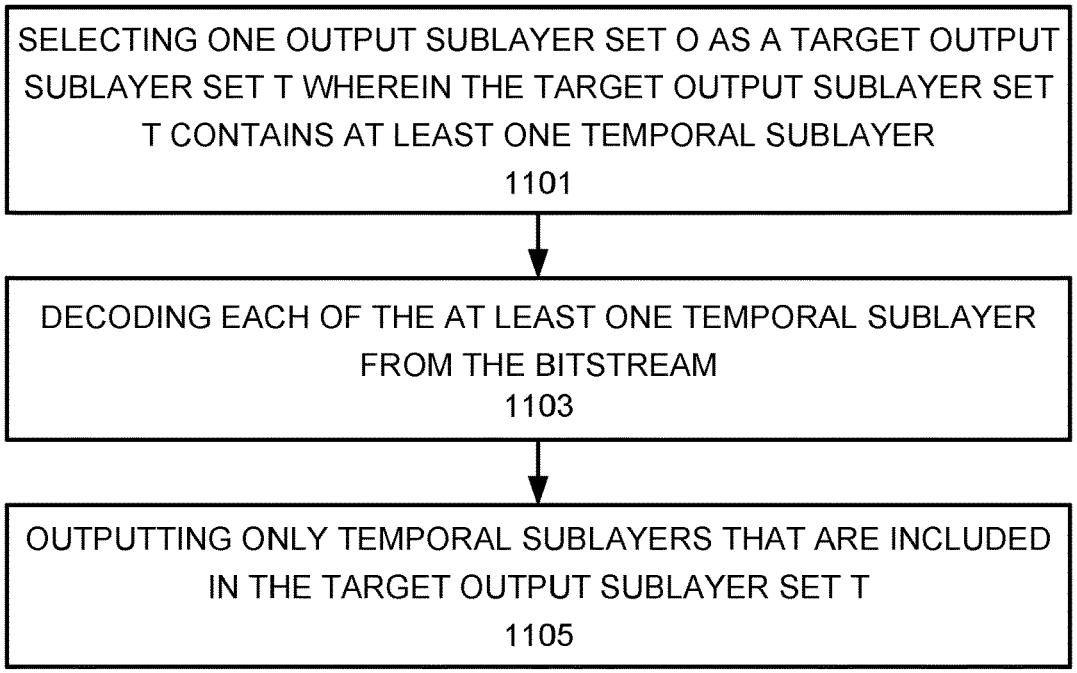

FIG. 11 illustrates an embodiment of inventive concepts where only temporal sublayers that are included in a target output sublayer set are output.

Turning to FIG. 11, in block 1101, the processing circuitry 501 selects one output sublayer set O as a target output sublayer set T wherein the target output sublayer set T contains at least one temporal sublayer.

In block 1103, the processing circuitry 501 decodes each of the at least one temporal sublayer from the bitstream. In block 1105, the processing circuitry 501 outputs only temporal sublayers that are includes in the target output sublayer set T.

Further details of the target output sublayer set T are described above.

In various embodiments of the inventive concepts in FIGS. 9-11, in determining the at least one output sublayer set O, the processing circuitry 501 further decodes a syntax element for each temporal sublayer of the determined N number of temporal sublayers, wherein the syntax element having a first value specifies that the temporal sublayer is included in the output sublayer set O, and the syntax element having a second value different to the first value specifies that the temporal sublayer is not included in the output sublayer set O.

In various embodiments of the inventive concepts in FIGS. 9-11, the processing circuitry 501 decodes a syntax element S for each temporal sublayer that is included in the output sublayer set O, where the syntax element S having a first value specifies that the temporal sublayer is an output sublayer in output sublayer set O, and the syntax element S having a second value different to the first value specifies that the temporal sublayer is not an output sublayer in the output sublayer set O.

FIG. 12 illustrates an embodiment of inventive concepts where the one or more temporal sublayer property values comprises the picture width and picture height per temporal sublayer information for at least one of the N temporal sublayers.

Turning to FIG. 12, in block 1201, the processing circuitry 501 decodes, for each temporal sublayer of the at least one of the N temporal sublayers, a picture width value W from the bitstream and a picture height value H from the bitstream, wherein all pictures that belong to the temporal sublayer have a width equal to W and a height equal to H.

In some embodiments, the picture width value W comprises an output picture width value and the picture height value H comprises an output picture height value In yet other embodiments, the picture width value comprises a maximum picture width value and the picture height value comprises a maximum picture height value.

FIG. 13 illustrates an embodiment of inventive concepts where the one or more temporal sublayer property values comprises the sublayer multiview information for at least one of the N temporal sublayers.

Turning now to FIG. 13, in block 1301, the processing circuitry 501 decodes, for each of the at least one of the N temporal sublayers, a View ID value for the temporal sublayer.

FIG. 14 illustrates an embodiment of inventive concepts where the one or more temporal sublayer property values comprises the sublayer auxiliary information for at least one of the N temporal sublayers.

Turning to FIG. 14, in block 1401, the processing circuitry 501 determines that at least one temporal sublayer of the at least one of the N temporal sublayers contains auxiliary pictures.

In some embodiments, in determining that at least one temporal sublayer of the at least one of the N temporal sublayers contains auxiliary pictures, the processing circuitry 501 determines that the at least one temporal sublayer contains one of an alpha plane and depth picture.

FIG. 15 illustrates an embodiment of inventive concepts where the one or more temporal sublayer property values comprises the sublayer quality information for at least two of the N temporal sublayers comprising a first temporal sublayer and a second temporal sublayer.

Turning to FIG. 15, in block 1501, the processing circuitry 501 determines that a quality of the first temporal sublayer is higher than a quality of the second temporal sublayer.

In various embodiments of inventive concepts, in the embodiments illustrated in FIG. 7-15, the processing circuitry 501 decodes the one or more temporal sublayer property values from a supplementary enhancement information, SEI, message in the bitstream.

In various other embodiments of inventive concepts, in the embodiments illustrated in FIGS. 7-15, the processing circuitry 501 decodes the one or more temporal sublayer property values from a parameter set in the bitstream.

In yet other various embodiments of inventive concepts, in the embodiments illustrated in FIGS. 7-15, the processing circuitry 501 decodes the one or more temporal sublayer property values from an entry, box, or a property unit in a systems layer of the bitstream.

In the description that follows, operations of the encoder 300 (implemented using the structure of the block diagram of FIG. 6) will now be discussed with reference to the flow chart of FIG. 16 according to some embodiments of inventive concepts. For example, modules may be stored in memory 603 of FIG. 6, and these modules may provide instructions so that when the instructions of a module are executed by respective encoder processing circuitry 601, processing circuitry 601 performs respective operations of the flow chart. Note that when the encoder 300 is distributed across various entities, the processor 601, in the encoding operations described below may, in encoding may direct one or more of the various entities to perform encoding operations. Thus, the processor 601 encodes information by initiating one or more of the various entities to perform encoding operations. In other words, the processor 601 initiates encoding. Thus, in the description below, encoding includes initiating encoding.

FIG. 16 illustrates a method for encoding one or more temporal sublayer properties from a bitstream. Turning to FIG. 16, in block 1601, the processing circuitry 601 determines a number N of temporal sublayers having one or more temporal sublayer property values to be in the bitstream. As described above, N is the number of temporal sublayers for which temporal sublayer properties are specified. The temporal sublayer ID's covered are 0, 1, . . . , N−1. The bitstream may contain fewer or more temporal sublayers which means that, e.g., there may be no picture of temporal sublayer N−2 in the bitstream but there may be a picture of temporal sublayer N+1 in the bitstream.

In block 1603, the processing circuitry 601, for each temporal sublayer of the N temporal sublayers having one or more temporal sublayer property values, encodes the one or more temporal sublayer property values into the bitstream wherein the one or more temporal sublayer property values comprises one or more of
   sublayer referencing information;
   output sublayer set information;
   picture width and picture height per temporal sublayer information;
   sublayer multiview information;
   sublayer auxiliary information; and/or
   sublayer quality information.

In block 1605, the processing circuitry 601 encodes a picture into the bitstream based on the one or more temporal sublayer property values. For example, when there are three temporal sublayers, the processing circuitry 601 encodes the picture based on the one or more temporal sublayer property values of the three temporal sublayers.

Various operations from the flow chart of FIG. 16 may be optional with respect to some embodiments of encoders and related methods. Regarding methods of example embodiment 1 (set forth below), for example, operations of block 705 of FIG. 7 may be optional.

FIG. 17 illustrates an embodiment of inventive concepts where the one or more temporal sublayer property values comprises the sublayer referencing information for at least one of the N temporal sublayers.

Turning to FIG. 17, in block 1701, the processing circuitry 601 encodes a set of syntax element values into a set of syntax elements wherein each first syntax element value in the set of syntax element values specifies whether or not a first temporal sublayer of the N number of temporal sublayers is not a direct reference sublayer to a second temporal sublayer of the N number of temporal sublayers.

In some embodiments of inventive concepts, the processing circuitry 601, can encode the set of syntax element values in accordance with

```
for( i = 0; i < num_sublayers; i++ )
    for( j = 0; j < i; j++ )
        flag[ i ][ j ]
``` where num_sublayers is the number N of temporal sublayers and flag[i][j] is a syntax element in the set of syntax elements and the value of flag[i][j] indicates whether or not temporal sublayer j is not a direct reference sublayer to temporal sublayer i. In some of these embodiments of inventive concepts, j<i includes when j=i.

In various embodiments, one value of a first syntax element indicates that there is no picture belonging to the first temporal sublayer in the bitstream that is used as a reference picture for any picture belonging to the second temporal sublayer in the bitstream.

FIG. 18 illustrates an embodiment of inventive concepts where the one or more temporal sublayer property values comprises the output sublayer set information for at least one of the N temporal sublayers.

Turning to FIG. 18, in block 1801, the processing circuitry 601 determines at least one output sublayer set O comprising temporal sublayers.

In block 1803, the processing circuitry 601 encodes into the bitstream, information specifying which temporal sublayers that are included in the at least one output sublayer set O.

In some embodiments of inventive concepts, the processing circuitry 601 encodes two or more output sublayer sets from the bitstream, wherein none of the two or more output sublayer sets contains an identical set of temporal sublayers.

FIG. 19 illustrates an embodiment of inventive concepts where only temporal sublayers that are included in the at least one output sublayer set O are to be output by the decoder 306.

Turning to FIG. 19, in block 1901, the processing circuitry 601 encodes, into the bitstream, information indicating whether the temporal sublayer is an output sublayer in the output sublayer set O or is a non-output sublayer in the output sublayer set O, wherein the output sublayer set O contains at least one temporal sublayer that is an output sublayer and wherein the output sublayer set O contains at least one temporal sublayer that is a non-output sublayer.

FIG. 20 illustrates an embodiment of inventive concepts where a syntax element is encoded to specify whether the temporal sublayer is an output sublayer.

Turning to FIG. 20, in block 2001, the processing circuitry 601 encodes a syntax element value into a syntax element S for each temporal sublayer that is included in the output sublayer set O, where the syntax element S having a first value specifies that the temporal sublayer is an output sublayer in output sublayer set O, and the syntax element S having a second value different to the first value specifies that the temporal sublayer is not an output sublayer in the output sublayer set O.

FIG. 21 illustrates an embodiment of inventive concepts where the one or more temporal sublayer property values comprises the picture width and picture height per temporal sublayer information for at least one of the N temporal sublayers.

Turning to FIG. 21, in block 2101, the processing circuitry 601 encodes, for each temporal sublayer of the at least one of the N temporal sublayers, a picture width value W into the bitstream and a picture height value H into the bitstream, wherein all pictures that belong to the temporal sublayer have a width equal to W and a height equal to H.

In some embodiments, the picture width value W comprises an output picture width value and the picture height value H comprises an output picture height value In yet other embodiments, the picture width value comprises a maximum picture width value and the picture height value comprises a maximum picture height value.

FIG. 22 illustrates an embodiment of inventive concepts where the one or more temporal sublayer property values comprises the sublayer multiview information for at least one of the N temporal sublayers.

Turning now to FIG. 22, in block 2201, the processing circuitry 601 encodes, into the bitstream, for each of the at least one of the N temporal sublayers, a View ID value for the temporal sublayer.

FIG. 23 illustrates an embodiment of inventive concepts where the one or more temporal sublayer property values comprises the sublayer auxiliary information for at least one of the N temporal sublayers.

Turning to FIG. 23, in block 2301, the processing circuitry 601 determines that at least one temporal sublayer of the at least one of the N temporal sublayers contains auxiliary pictures.

In block 2301, the processing circuitry 501 encodes information indicating that the at least one temporal sublayer contains one of an alpha plane and depth picture.

FIG. 24 illustrates an embodiment of inventive concepts where the one or more temporal sublayer property values comprises the sublayer quality information for at least two of the N temporal sublayers comprising a first temporal sublayer and a second temporal sublayer.

Turning to FIG. 24, in block 2401, the processing circuitry 601 encodes information into the bitstream indicating that a quality of the first temporal sublayer is higher than a quality of the second temporal sublayer.

In various embodiments of inventive concepts, in the embodiments illustrated in FIGS. 16-24, the processing circuitry 601 encodes the one or more temporal sublayer property values into a supplementary enhancement information, SEI, message in the bitstream.

In various other embodiments of inventive concepts, in the embodiments illustrated in FIGS. 16-24, the processing circuitry 601 encodes the one or more temporal sublayer property values into a parameter set in the bitstream.

In yet other various embodiments of inventive concepts, in the embodiments illustrated in FIGS. 16-24, the processing circuitry 601 encodes the one or more temporal sublayer property values into an entry, a box, or a property unit in a systems layer of the bitstream.

Example embodiments are discussed below.

Embodiment 1. A method for determining one or more temporal sublayer properties from a bitstream, the method comprising:
  determining (701), from the bitstream, a number N of temporal sublayers for which one or more temporal sublayer properties are specified; and
  for each temporal sublayer of the N temporal sublayers having one or more temporal sublayer property values, decoding (703) the one or more temporal sublayer property values from the bitstream wherein the one or more temporal sublayer property values comprises one or more of:
    sublayer referencing information;
    output sublayer set information;
    picture width and picture height per temporal sublayer information;
    sublayer multiview information;
    sublayer auxiliary information; and/or
    sublayer quality information.

Embodiment 2. The method of Embodiment 1 wherein the one or more temporal sublayer property values comprises the sublayer referencing information for at least one of the N temporal sublayers, the method further comprising:
  decoding (801) a set of syntax elements into a set of syntax element values wherein each first syntax element value in the set of syntax element values specifies whether or not a first temporal sublayer of the N number of temporal sublayers is not a direct reference sublayer to a second temporal sublayer of the N number of temporal sublayers.

Embodiment 3. The method of Embodiment 2, wherein decoding the set of syntax elements comprises decoding the set of syntax elements in accordance with

```
for( i = 0; i < num_sublayers; i++ )
  for( j = 0; j < i; j++ )
    flag[ i ][ j ]
``` where num_sublayers is the number N of temporal sublayers and flag[i][j] is a syntax element in the set of syntax elements and the value of flag[i][j] indicates whether or not temporal sublayer j is not a direct reference sublayer to temporal sublayer i.

Embodiment 4. The method of any of Embodiments 2-3 wherein one value of a first syntax element indicates that there is no picture belonging to the first temporal sublayer in the bitstream that is used as a reference picture for any picture belonging to the second temporal sublayer in the bitstream.

Embodiment 5. The method of any previous Embodiment wherein the one or more temporal sublayer property values comprises the output sublayer set information for at least one of the N temporal sublayers, the method further comprising:
  determining (901) at least one output sublayer set O comprising temporal sublayers by decoding a first set of syntax elements from the bitstream; and
  decoding one or more pictures from the bitstream and outputting (903) pictures that are included in temporal sublayers that are included in the at least one output sublayer set O.

Embodiment 6. The method of Embodiment 5, further comprising obtaining two or more output sublayer sets from the bitstream, wherein none of the two or more output sublayer sets contains an identical set of temporal sublayers.

Embodiment 7. The method of Embodiment 6, further comprising:
  determining (1001) from the bitstream, for each temporal sublayer in the output sublayer set O, whether the temporal sublayer is an output sublayer in the output sublayer set O or is a non-output sublayer in the output sublayer set O, wherein the output sublayer set O contains at least one temporal sublayer that is an output sublayer and wherein the output sublayer set O contains at least one temporal sublayer that is a non-output sublayer; and
  outputting (1003) only temporal sublayers that are included in the at least one output sublayer set O and determined from the bitstream to be an output sublayer in the output sublayer set O.

Embodiment 8. The method of any of Embodiments 6-7 further comprising
- selecting (1101) one output sublayer set O as a target output sublayer set T wherein the target output sublayer set T contains at least one temporal sublayer;
- decoding (1103) each of the at least one temporal sublayer from the bitstream; and
- outputting (1105) only temporal sublayers that are included in the target output sublayer set T.

Embodiment 9. The method of any of Embodiments 5-8 wherein determining the at least one output sublayer set O further comprises decoding a syntax element for each temporal sublayer of the determined N number of temporal sublayers, wherein the syntax element having a first value specifies that the temporal sublayer is included in the output sublayer set O, and the syntax element having a second value different to the first value specifies that the temporal sublayer is not included in the output sublayer set O.

Embodiment 10. The method of Embodiment 9 further comprising decoding a syntax element S for each temporal sublayer that is included in the output sublayer set O, where the syntax element S having a first value specifies that the temporal sublayer is an output sublayer in output sublayer set O, and the syntax element S having a second value different to the first value specifies that the temporal sublayer is not an output sublayer in the output sublayer set O.

Embodiment 11. The method of any previous Embodiment wherein the one or more temporal sublayer property values comprises the picture width and picture height per temporal sublayer information for at least one of the N temporal sublayers, the method further comprising:
- decoding (1201), for each temporal sublayer of the at least one of the N temporal sublayers, a picture width value W from the bitstream and a picture height value H from the bitstream, wherein all pictures that belong to the temporal sublayer have a width equal to W and a height equal to H.

Embodiment 12. The method of Embodiment 11 wherein the picture width value W comprises an output picture width value and the picture height value H comprises an output picture height value.

Embodiment 13. The method of any of Embodiments 11-12 wherein the picture width value W comprises a maximum picture width value and the picture height value H comprises a maximum picture height value.

Embodiment 14. The method of any previous Embodiment wherein the one or more temporal sublayer property values comprises the sublayer multiview information for at least one of the N temporal sublayers, the method further comprising
- decoding (1301), for each of the at least one of the N temporal sublayers, a View ID value for the temporal sublayer.

Embodiment 15. The method of any previous Embodiment wherein the one or more temporal sublayer property values comprises the sublayer auxiliary information for at least one of the N temporal sublayers, and the method further comprises determining (1401) that at least one temporal sublayer of the at least one of the N temporal sublayers contains auxiliary pictures.

Embodiment 16. The method of Embodiment 15 wherein determining that at least one temporal sublayer of the at least one of the N temporal sublayers contains auxiliary pictures comprises determining that the at least one temporal sublayer contains one of an alpha plane and depth picture.

Embodiment 17. The method of any previous embodiment wherein the one or more temporal sublayer property values comprises the sublayer quality information for at least two of the N temporal sublayers comprising a first temporal sublayer and a second temporal sublayer, the method further comprising determining (1501) that a quality of the first temporal sublayer is higher than a quality of the second temporal sublayer.

Embodiment 18. The method of any previous Embodiment wherein the one or more temporal sublayer property values are decoded from a supplementary enhancement information, SEI, message in the bitstream.

Embodiment 19. The method of any previous Embodiment wherein the one or more temporal sublayer property values are decoded from a parameter set in the bitstream.

Embodiment 20. The method of any previous Embodiment wherein the one or more temporal sublayer property values are decoded from an entry, box, or a property unit in a systems layer of the bitstream.

Embodiment 21. The method of any of Embodiments 1-20, further comprising:
- decoding (705) a picture from the bitstream based on the one or more temporal sublayer property values of at least one temporal sublayer.

Embodiment 22. A decoder (406, 4200, 4330, 4340, 4491, 4492, 4530) comprising:
- processing circuitry (503, 4120, 4201, 4360 4538); and
- memory (505, 4130, 4215) coupled with the processing circuitry, wherein the memory includes instructions that when executed by the processing circuitry causes the decoder to perform operations according to any of Embodiments 1-21.

Embodiment 23. A decoder (306, 4200, 4330, 4340, 4491, 4492, 4530) adapted to perform according to any of Embodiments 1-21.

Embodiment 24. A computer program comprising program code to be executed by processing circuitry (503, 4120, 4201, 4360, 4538) of a decoder (306, 4200, 4330, 4340, 4491, 4492, 4530), whereby execution of the program code causes the decoder (306, 4200, 4330, 4340, 4491, 4492, 4530) to perform operations according to any of embodiments 1-21.

Embodiment 25. A computer program product comprising a non-transitory storage medium including program code to be executed by processing circuitry (503, 4120, 4201, 4360, 4538) of a communication device (406, 4200, 4330, 4340, 4491, 4492, 4530), whereby execution of the program code causes the decoder (406, 4200, 4330, 4340, 4491, 4492, 4530) to perform operations according to any of embodiments 1-21.

Embodiment 26. A method for encoding one or more temporal sublayer properties into a bitstream, the method comprising:
- determining (1601) a number N of temporal sublayers having one or more temporal sublayer property values to be encoded into the bitstream; and
- for each temporal sublayer of the N temporal sublayers, encoding (1603) the one or more temporal sublayer property values into the bitstream wherein the one or more temporal sublayer property values comprises one or more of:
  - sublayer referencing information;
  - output sublayer set information;
  - picture width and picture height per temporal sublayer information;
  - sublayer multiview information;
  - sublayer auxiliary information; and/or
  - sublayer quality information.

Embodiment 27. The method of Embodiment 26 wherein the one or more temporal sublayer property values comprises the sublayer referencing information for at least one of the N temporal sublayers, the method further comprising encoding (1701) a set of syntax element values into a set of syntax elements wherein each first syntax element value in the set of syntax element values specifies whether or not a first temporal sublayer of the N number of temporal sublayers is not a direct reference sublayer to a second temporal sublayer of the N number of temporal sublayers.

Embodiment 28. The method of Embodiment 27, wherein encoding the set of syntax element values comprises encoding the set of syntax elements in accordance with

```
for( i = 0; i < num_sublayers; i++ )
    for( j = 0; j < i; j++ )
        flag[ i ][ j ]
``` where num_sublayers is the number N of temporal sublayers and flag[i][j] is a syntax element in the set of syntax elements and the value of flag[i][j] indicates whether or not temporal sublayer j is not a direct reference sublayer to temporal sublayer i.

Embodiment 29. The method of any of Embodiments 27-28 wherein one value of a first syntax element indicates that there is no picture belonging to the first temporal sublayer in the bitstream that is used as a reference picture for any picture belonging to the second temporal sublayer in the bitstream.

Embodiment 30. The method of any of Embodiments 26-29 wherein the one or more temporal sublayer property values comprises the output sublayer set information for at least one of the N temporal sublayers, the method further comprising:

determining (1801) at least one output sublayer set O comprising temporal sublayers; and encoding (1803) into the bitstream, information specifying which temporal sublayers that are included in the at least one output sublayer set O.

Embodiment 31. The method of Embodiment 30 wherein extraction of the temporal sublayers included in the output sublayer set O from the bitstream results in a decodable bitstream.

Embodiment 32. The method of any of Embodiments 30-31, further comprising encoding two or more output sublayer sets into the bitstream, wherein none of the two or more output sublayer sets contains an identical set of temporal sublayers.

Embodiment 33. The method of any of Embodiments 30-31, further comprising:

encoding (1901) into the bitstream, for each temporal sublayer in the output sublayer set O, information indicating whether the temporal sublayer is an output sublayer in the output sublayer set O or is a non-output sublayer in the output sublayer set O, wherein the output sublayer set O contains at least one temporal sublayer that is an output sublayer and wherein the output sublayer set O contains at least one temporal sublayer that is a non-output sublayer.

Embodiment 34. The method of any of Embodiments 30-33, further comprising encoding a syntax element value into a syntax element for each temporal sublayer of the determined N number of temporal sublayers, wherein the syntax element having a first value specifies that the temporal sublayer is included in the output sublayer set O, and the syntax element having a second value different to the first value specifies that the temporal sublayer is not included in the output sublayer set O.

Embodiment 35. The method of Embodiment 34 further comprising encoding (2001) a syntax element value into a syntax element S for each temporal sublayer that is included in the output sublayer set O, where the syntax element S having a first value specifies that the temporal sublayer is an output sublayer in output sublayer set O, and the syntax element S having a second value different to the first value specifies that the temporal sublayer is not an output sublayer in the output sublayer set O.

Embodiment 36. The method of any of Embodiments 26-35 wherein the one or more temporal sublayer property values comprises the picture width and picture height per temporal sublayer information for at least one of the N temporal sublayers, the method further comprising:

encoding (2101), for each temporal sublayer of the at least one of the N temporal sublayers, a picture width value W into the bitstream and a picture height value H into the bitstream, specifying that all pictures that belong to the temporal sublayer have a width equal to W and a height equal to H.

Embodiment 37. The method of Embodiment 36 wherein the picture width value W comprises an output picture width value and the picture height value H comprises an output picture height value.

Embodiment 38. The method of any of Embodiments 36-37 wherein the picture width value W comprises a maximum picture width value and the picture height value H comprises a maximum picture height value.

Embodiment 39. The method of any of Embodiments 26-38 wherein the one or more temporal sublayer property values comprises the sublayer multiview information for at least one of the N temporal sublayers, the method further comprising encoding (2201), into the bitstream, for each of the at least one of the N temporal sublayers, a View ID value for the temporal sublayer.

Embodiment 40. The method of any of Embodiments 26-39 wherein the one or more temporal sublayer property values comprises the sublayer auxiliary information for at least one of the N temporal sublayers, and the method further comprises encoding information indicating that at least one temporal sublayer of the at least one of the N temporal sublayers contains auxiliary pictures.

Embodiment 41. The method of Embodiment 40 wherein encoding that at least one temporal sublayer of the at least one of the N temporal sublayers contains auxiliary pictures comprises encoding (2301) information indicating that the at least one temporal sublayer contains one of an alpha plane and depth picture.

Embodiment 42. The method of any of Embodiments 26-41 wherein the one or more temporal sublayer property values comprises the sublayer quality information for at least two of the N temporal sublayers comprising a first temporal sublayer and a second temporal sublayer, the method further comprising encoding (2401) information into the bitstream indicating that a quality of the first temporal sublayer is higher than a quality of the second temporal sublayer.

Embodiment 43. The method of any of Embodiments 26-42 further comprising encoding the one or more temporal sublayer property values into an SEI message in the bitstream.

Embodiment 44. The method of any of Embodiments 26-42 further comprising encoding the one or more temporal sublayer property values into a parameter set in the bitstream.

Embodiment 45. The method of any of Embodiments 26-42 further comprising encoding the one or more temporal sublayer property values into an entry, a box, or a property unit in a systems layer of the bitstream.

Embodiment 46. The method of any of Embodiments 26-45, further comprising:
 encoding (1605) a picture into the bitstream based on the one or more temporal sublayer property values.

Embodiment 47. An encoder (300, 4200, 4330, 4340, 4491, 4492, 4530) comprising:
 processing circuitry (603, 4120, 4201, 4360 4538); and
 memory (605, 4130, 4215) coupled with the processing circuitry, wherein the memory includes instructions that when executed by the processing circuitry causes the communication device to perform operations according to any of Embodiments 26-46.

Embodiment 48. An encoder (300, 4200, 4330, 4340, 4491, 4492, 4530) adapted to perform according to any of Embodiments 26-46.

Embodiment 49. A computer program comprising program code to be executed by processing circuitry (603, 4120, 4201, 4360, 4538) of an encoder (300, 4200, 4330, 4340, 4491, 4492, 4530), whereby execution of the program code causes the encoder (300, 4200, 4330, 4340, 4491, 4492, 4530) to perform operations according to any of Embodiments 26-46.

Embodiment 50. A computer program product comprising a non-transitory storage medium including program code to be executed by processing circuitry (603, 4120, 4201, 4360, 4538) of an encoder (300, 4200, 4330, 4340, 4491, 4492, 4530), whereby execution of the program code causes the encoder (300, 4200, 4330, 4340, 4491, 4492, 4530) to perform operations according to any of Embodiments 26-46.

References are identified below.
1. Rec. ITU-T H.2661 ISO/IEC 23090-3, "Versatile Video Coding", 2020.
2. Rec. ITU-T Rec. H.2741 ISO/IEC 23002-7, "Versatile Supplemental Enhancement Information Messages for Coded Video Bitstreams", 2020
3. M. Pettersson et al. "AHG9: Picture output suppression SEI message", JVET-U0045, the 21st JVET meeting, Teleconference, 6-15 Jan. 2021.

Additional explanation is provided below.

As used herein, a network element, node or subsystem including a decoder and/or encoder may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Skilled artisans will recognize that the foregoing generalized example network environment 100 may be implemented in a hierarchical network architecture, with various aspects of media capture and preparation, including, e.g., source stream stitching, projection mapping, source media compression, tiled/ABR (average bitrate) encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 25:
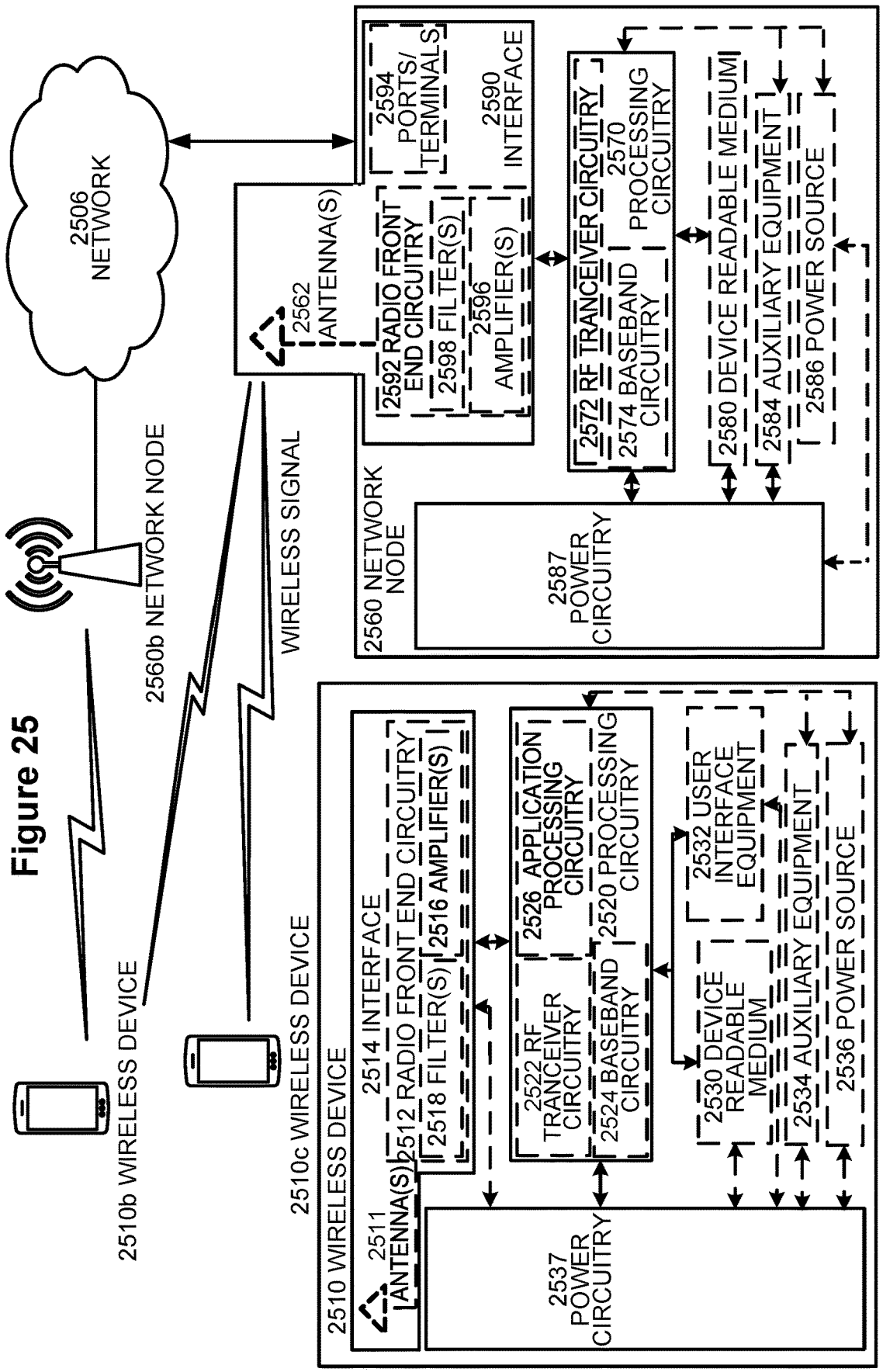
FIG. 25 is a block diagram of a wireless network in accordance with some embodiments.

FIG. 25 illustrates a wireless network in accordance with some embodiments where a decoder and encoder can be utilized.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 2506, network nodes 2560 and 2560*b*, and WDs 2510, 2510*b*, and 2510*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 2560 and wireless device (WD) 2510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2560 and WD 2510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobility management entities (MMEs)), O&M nodes, operations support system (OSS) nodes, self-organizing network (SON) nodes, positioning nodes (e.g., enhanced serving mobile location centers (E-SMLCs)), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 2560 includes processing circuitry 2570, device readable medium 2580, interface 2590, auxiliary equipment 2584, power source 2586, power circuitry 2587, and antenna 2562. Although network node 2560 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2560 are depicted as single boxes located within a larger box, or nested within multiple boxes, in practice, a network node may comprise multiple different physical components that make up a single illustrated component (e.g., device readable medium 2580 may comprise multiple separate hard drives as well as multiple RAM modules).

Similarly, network node 2560 may be composed of multiple physically separate components (e.g., a NodeB component and a RNC component, or a BTS component and a BSC component, etc.), which may each have their own respective components. In certain scenarios in which network node 2560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2560 may be configured to support multiple radio access technologies (RATs). In such embodiments, some components may be duplicated (e.g., separate device readable medium 2580 for the different RATs) and some components may be reused (e.g., the same antenna 2562 may be shared by the RATs). Network node 2560 may also include multiple sets of the various illustrated components for different wireless technologies integrated into network node 2560, such as, for example, GSM, WCDMA, LTE, NR, WiFi, or Bluetooth wireless technologies. These wireless technologies may be integrated into the same or different chip or set of chips and other components within network node 2560.

Processing circuitry 2570 is configured to perform any determining, calculating, or similar operations (e.g., certain obtaining operations) described herein as being provided by a network node. These operations performed by processing circuitry 2570 may include processing information obtained by processing circuitry 2570 by, for example, converting the obtained information into other information, comparing the obtained information or converted information to information stored in the network node, and/or performing one or more operations based on the obtained information or converted information, and as a result of said processing making a determination.

Processing circuitry 2570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2560 components, such as device readable medium 2580, network node 2560 functionality. For example, processing circuitry 2570 may execute instructions stored in device readable medium 2580 or in memory within processing circuitry 2570. Such functionality may include providing any of the various wireless features, functions, or benefits discussed herein. In some embodiments, processing circuitry 2570 may include a system on a chip (SOC).

In some embodiments, processing circuitry 2570 may include one or more of radio frequency (RF) transceiver circuitry 2572 and baseband processing circuitry 2574. In some embodiments, radio frequency (RF) transceiver circuitry 2572 and baseband processing circuitry 2574 may be on separate chips (or sets of chips), boards, or units, such as radio units and digital units. In alternative embodiments, part or all of RF transceiver circuitry 2572 and baseband processing circuitry 2574 may be on the same chip or set of chips, boards, or units In certain embodiments, some or all of the functionality described herein as being provided by a network node, base station, eNB or other such network device may be performed by processing circuitry 2570 executing instructions stored on device readable medium 2580 or memory within processing circuitry 2570. In alternative embodiments, some or all of the functionality may be provided by processing circuitry 2570 without executing instructions stored on a separate or discrete device readable medium, such as in a hard-wired manner. In any of those embodiments, whether executing instructions stored on a device readable storage medium or not, processing circuitry 2570 can be configured to perform the described functionality. The benefits provided by such functionality are not limited to processing circuitry 2570 alone or to other components of network node 2560, but are enjoyed by network node 2560 as a whole, and/or by end users and the wireless network generally.

Device readable medium 2580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2570. Device readable medium 2580 may store any suitable instructions, data or information, including a computer program, software, an application including one or more of logic, rules, code, tables, etc. and/or other instructions capable of being executed by processing circuitry 2570 and, utilized by network node 2560. Device readable medium 2580 may be used to store any calculations made by processing circuitry 2570 and/or any data received via interface 2590. In some embodiments, processing circuitry 2570 and device readable medium 2580 may be considered to be integrated.

Interface 2590 is used in the wired or wireless communication of signalling and/or data between network node 2560, network 2506, and/or WDs 2510. As illustrated, interface 2590 comprises port(s)/terminal(s) 2594 to send and receive data, for example to and from network 2506 over a wired connection. Interface 2590 also includes radio front end circuitry 2592 that may be coupled to, or in certain embodiments a part of, antenna 2562. Radio front end circuitry 2592 comprises filters 2598 and amplifiers 2596. Radio front end circuitry 2592 may be connected to antenna 2562 and processing circuitry 2570. Radio front end circuitry may be configured to condition signals communicated between antenna 2562 and processing circuitry 2570. Radio front end circuitry 2592 may receive digital data that is to be sent out to other network nodes or WDs via a wireless connection. Radio front end circuitry 2592 may convert the digital data into a radio signal having the appropriate channel and bandwidth parameters using a combination of filters 2598 and/or amplifiers 2596. The radio signal may then be transmitted via antenna 2562. Similarly, when receiving data, antenna 2562 may collect radio signals which are then converted into digital data by radio front end circuitry 2592. The digital data may be passed to processing circuitry 2570. In other embodiments, the interface may comprise different components and/or different combinations of components.

In certain alternative embodiments, network node 2560 may not include separate radio front end circuitry 2592, instead, processing circuitry 2570 may comprise radio front end circuitry and may be connected to antenna 2562 without separate radio front end circuitry 2592. Similarly, in some embodiments, all or some of RF transceiver circuitry 2572 may be considered a part of interface 2590. In still other embodiments, interface 2590 may include one or more ports or terminals 2594, radio front end circuitry 2592, and RF transceiver circuitry 2572, as part of a radio unit (not shown), and interface 2590 may communicate with baseband processing circuitry 2574, which is part of a digital unit (not shown).

Antenna 2562 may include one or more antennas, or antenna arrays, configured to send and/or receive wireless signals. Antenna 2562 may be coupled to radio front end circuitry 2592 and may be any type of antenna capable of transmitting and receiving data and/or signals wirelessly. In some embodiments, antenna 2562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2562 may be separate from network node 2560 and may be connectable to network node 2560 through an interface or port.

Antenna 2562, interface 2590, and/or processing circuitry 2570 may be configured to perform any receiving operations and/or certain obtaining operations described herein as being performed by a network node. Any information, data and/or signals may be received from a wireless device, another network node and/or any other network equipment. Similarly, antenna 2562, interface 2590, and/or processing circuitry 2570 may be configured to perform any transmitting operations described herein as being performed by a network node. Any information, data and/or signals may be transmitted to a wireless device, another network node and/or any other network equipment.

Power circuitry 2587 may comprise, or be coupled to, power management circuitry and is configured to supply the components of network node 2560 with power for performing the functionality described herein. Power circuitry 2587 may receive power from power source 2586. Power source 2586 and/or power circuitry 2587 may be configured to provide power to the various components of network node 2560 in a form suitable for the respective components (e.g., at a voltage and current level needed for each respective component). Power source 2586 may either be included in, or external to, power circuitry 2587 and/or network node 2560. For example, network node 2560 may be connectable to an external power source (e.g., an electricity outlet) via an input circuitry or interface such as an electrical cable, whereby the external power source supplies power to power circuitry 2587. As a further example, power source 2586 may comprise a source of power in the form of a battery or battery pack which is connected to, or integrated in, power circuitry 2587. The battery may provide backup power should the external power source fail. Other types of power sources, such as photovoltaic devices, may also be used.

Alternative embodiments of network node 2560 may include additional components beyond those shown in FIG. 25 that may be responsible for providing certain aspects of the network node's functionality, including any of the functionality described herein and/or any functionality necessary to support the subject matter described herein. For example, network node 2560 may include user interface equipment to allow input of information into network node 2560 and to allow output of information from network node 2560. This may allow a user to perform diagnostic, maintenance, repair, and other administrative functions for network node 2560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2510 includes antenna 2511, interface 2514, processing circuitry 2520, device readable medium 2530, user interface equipment 2532, auxiliary equipment 2534, power source 2536 and power circuitry 2537. WD 2510 may include multiple sets of one or more of the illustrated components for different wireless technologies supported by WD 2510, such as, for example, GSM, WCDMA, LTE, NR, WiFi, WiMAX, or Bluetooth wireless technologies, just to mention a few. These wireless technologies may be integrated into the same or different chips or set of chips as other components within WD 2510.

Antenna 2511 may include one or more antennas or antenna arrays, configured to send and/or receive wireless signals, and is connected to interface 2514. In certain alternative embodiments, antenna 2511 may be separate from WD 2510 and be connectable to WD 2510 through an interface or port. Antenna 2511, interface 2514, and/or processing circuitry 2520 may be configured to perform any receiving or transmitting operations described herein as being performed by a WD. Any information, data and/or signals may be received from a network node and/or another WD. In some embodiments, radio front end circuitry and/or antenna 2511 may be considered an interface.

As illustrated, interface 2514 comprises radio front end circuitry 2512 and antenna 2511. Radio front end circuitry 2512 comprise one or more filters 2518 and amplifiers 2516. Radio front end circuitry 2512 is connected to antenna 2511 and processing circuitry 2520, and is configured to condition signals communicated between antenna 2511 and processing circuitry 2520. Radio front end circuitry 2512 may be coupled to or a part of antenna 2511. In some embodiments, WD 2510 may not include separate radio front end circuitry 2512; rather, processing circuitry 2520 may comprise radio front end circuitry and may be connected to antenna 2511. Similarly, in some embodiments, some or all of RF transceiver circuitry 2522 may be considered a part of interface 2514. Radio front end circuitry 2512 may receive digital data that is to be sent out to other network nodes or WDs via a wireless connection. Radio front end circuitry 2512 may convert the digital data into a radio signal having the appropriate channel and bandwidth parameters using a combination of filters 2518 and/or amplifiers 2516. The radio signal may then be transmitted via antenna 2511. Similarly, when receiving data, antenna 2511 may collect radio signals which are then converted into digital data by radio front end circuitry 2512. The digital data may be passed to processing circuitry 2520. In other embodiments, the interface may comprise different components and/or different combinations of components.

Processing circuitry 2520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2510 components, such as device readable medium 2530, WD 2510 functionality. Such functionality may include providing any of the various wireless features or benefits discussed herein. For example, processing circuitry 2520 may execute instructions stored in device readable medium 2530 or in memory within processing circuitry 2520 to provide the functionality disclosed herein.

As illustrated, processing circuitry 2520 includes one or more of RF transceiver circuitry 2522, baseband processing circuitry 2524, and application processing circuitry 2526. In other embodiments, the processing circuitry may comprise different components and/or different combinations of components. In certain embodiments processing circuitry 2520 of WD 2510 may comprise a SOC. In some embodiments, RF transceiver circuitry 2522, baseband processing circuitry 2524, and application processing circuitry 2526 may be on separate chips or sets of chips. In alternative embodiments, part or all of baseband processing circuitry 2524 and application processing circuitry 2526 may be combined into one chip or set of chips, and RF transceiver circuitry 2522 may be on a separate chip or set of chips. In still alternative embodiments, part or all of RF transceiver circuitry 2522 and baseband processing circuitry 2524 may be on the same chip or set of chips, and application processing circuitry 2526 may be on a separate chip or set of chips. In yet other alternative embodiments, part or all of RF transceiver circuitry 2522, baseband processing circuitry 2524, and application processing circuitry 2526 may be combined in the same chip or set of chips. In some embodiments, RF transceiver circuitry 2522 may be a part of interface 2514. RF transceiver circuitry 2522 may condition RF signals for processing circuitry 2520.

In certain embodiments, some or all of the functionality described herein as being performed by a WD may be provided by processing circuitry 2520 executing instructions stored on device readable medium 2530, which in certain embodiments may be a computer-readable storage medium. In alternative embodiments, some or all of the functionality may be provided by processing circuitry 2520 without executing instructions stored on a separate or discrete device readable storage medium, such as in a hard-wired manner. In any of those particular embodiments, whether executing instructions stored on a device readable storage medium or not, processing circuitry 2520 can be configured to perform the described functionality. The benefits provided by such functionality are not limited to processing circuitry 2520 alone or to other components of WD 2510, but are enjoyed by WD 2510 as a whole, and/or by end users and the wireless network generally.

Processing circuitry 2520 may be configured to perform any determining, calculating, or similar operations (e.g., certain obtaining operations) described herein as being performed by a WD. These operations, as performed by processing circuitry 2520, may include processing information obtained by processing circuitry 2520 by, for example, converting the obtained information into other information, comparing the obtained information or converted information to information stored by WD 2510, and/or performing one or more operations based on the obtained information or converted information, and as a result of said processing making a determination.

Device readable medium 2530 may be operable to store a computer program, software, an application including one or more of logic, rules, code, tables, etc. and/or other instructions capable of being executed by processing circuitry 2520. Device readable medium 2530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2520. In some embodiments, processing circuitry 2520 and device readable medium 2530 may be considered to be integrated.

User interface equipment 2532 may provide components that allow for a human user to interact with WD 2510. Such interaction may be of many forms, such as visual, audial, tactile, etc. User interface equipment 2532 may be operable to produce output to the user and to allow the user to provide input to WD 2510. The type of interaction may vary depending on the type of user interface equipment 2532 installed in WD 2510. For example, if WD 2510 is a smart phone, the interaction may be via a touch screen; if WD 2510 is a smart meter, the interaction may be through a screen that provides usage (e.g., the number of gallons used) or a speaker that provides an audible alert (e.g., if smoke is detected). User interface equipment 2532 may include input interfaces, devices and circuits, and output interfaces, devices and circuits. User interface equipment 2532 is configured to allow input of information into WD 2510, and is connected to processing circuitry 2520 to allow processing circuitry 2520 to process the input information. User interface equipment 2532 may include, for example, a microphone, a proximity or other sensor, keys/buttons, a touch display, one or more cameras, a USB port, or other input circuitry. User interface equipment 2532 is also configured to allow output of information from WD 2510, and to allow processing circuitry 2520 to output information from WD 2510. User interface equipment 2532 may include, for example, a speaker, a display, vibrating circuitry, a USB port, a headphone interface, or other output circuitry. Using one or more input and output interfaces, devices, and circuits, of user interface equipment 2532, WD 2510 may communicate with end users and/or the wireless network, and allow them to benefit from the functionality described herein.

Auxiliary equipment 2534 is operable to provide more specific functionality which may not be generally performed by WDs. This may comprise specialized sensors for doing measurements for various purposes, interfaces for additional types of communication such as wired communications etc. The inclusion and type of components of auxiliary equipment 2534 may vary depending on the embodiment and/or scenario.

Power source 2536 may, in some embodiments, be in the form of a battery or battery pack. Other types of power sources, such as an external power source (e.g., an electricity outlet), photovoltaic devices or power cells, may also be used. WD 2510 may further comprise power circuitry 2537 for delivering power from power source 2536 to the various parts of WD 2510 which need power from power source 2536 to carry out any functionality described or indicated herein. Power circuitry 2537 may in certain embodiments comprise power management circuitry. Power circuitry 2537 may additionally or alternatively be operable to receive power from an external power source; in which case WD 2510 may be connectable to the external power source (such as an electricity outlet) via input circuitry or an interface such as an electrical power cable. Power circuitry 2537 may also in certain embodiments be operable to deliver power from an external power source to power source 2536. This may be, for example, for the charging of power source 2536. Power circuitry 2537 may perform any formatting, converting, or other modification to the power from power source 2536 to make the power suitable for the respective components of WD 2510 to which power is supplied.

Figure 26:
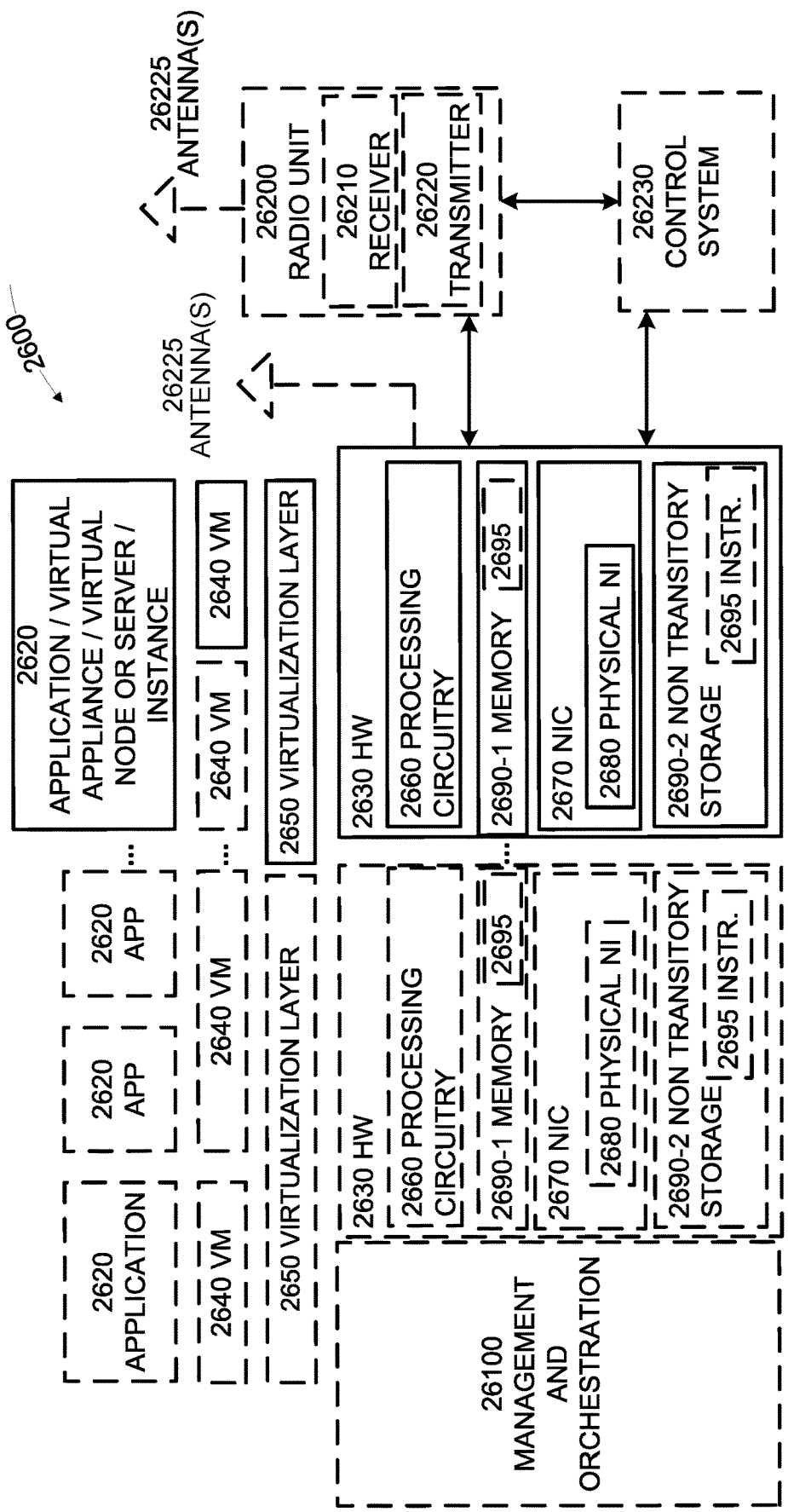
FIG. 26 is a block diagram of a virtualization environment in accordance with some embodiments.

FIG. 26 illustrates a virtualization environment in accordance with some embodiments.

FIG. 26 is a schematic block diagram illustrating a virtualization environment 2600 in which functions implemented by some embodiments of encoders 300 and/or decoders 306 may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2600 hosted by one or more of hardware nodes 2630. Further, in embodiments in which the virtual node is not a radio access node or does not require radio connectivity (e.g., a core network node), then the network node may be entirely virtualized.

The functions may be implemented by one or more applications 2620 (which may alternatively be called software instances, virtual appliances, network functions, virtual nodes, virtual network functions, etc.) operative to implement some of the features, functions, and/or benefits of some of the embodiments disclosed herein. Applications 2620 are run in virtualization environment 2600 which provides hardware 2630 comprising processing circuitry 2660 and memory 2690. Memory 2690 contains instructions 2695 executable by processing circuitry 2660 whereby application 2620 is operative to provide one or more of the features, benefits, and/or functions disclosed herein.

Virtualization environment 2600, comprises general-purpose or special-purpose network hardware devices 2630 comprising a set of one or more processors or processing circuitry 2660, which may be commercial off-the-shelf (COTS) processors, dedicated Application Specific Integrated Circuits (ASICs), or any other type of processing circuitry including digital or analog hardware components or special purpose processors. Each hardware device may comprise memory 2690-1 which may be non-persistent memory for temporarily storing instructions 2695 or software executed by processing circuitry 2660. Each hardware device may comprise one or more network interface controllers (NICs) 2670, also known as network interface cards, which include physical network interface 2680. Each hardware device may also include non-transitory, persistent, machine-readable storage media 2690-2 having stored therein software 2695 and/or instructions executable by processing circuitry 2660. Software 2695 may include any type of software including software for instantiating one or more virtualization layers 2650 (also referred to as hypervisors), software to execute virtual machines 2640 as well as software allowing it to execute functions, features and/or benefits described in relation with some embodiments described herein.

Virtual machines 2640 comprise virtual processing, virtual memory, virtual networking or interface and virtual storage, and may be run by a corresponding virtualization layer 2650 or hypervisor. Different embodiments of the instance of virtual appliance 2620 may be implemented on one or more of virtual machines 2640, and the implementations may be made in different ways.

During operation, processing circuitry 2660 executes software 2695 to instantiate the hypervisor or virtualization layer 2650, which may sometimes be referred to as a virtual machine monitor (VMM). Virtualization layer 2650 may present a virtual operating platform that appears like networking hardware to virtual machine 2640.

As shown in FIG. 26, hardware 2630 may be a standalone network node with generic or specific components. Hardware 2630 may comprise antenna 26225 and may implement some functions via virtualization. Alternatively, hardware 2630 may be part of a larger cluster of hardware (e.g. such as in a data center or customer premise equipment (CPE)) where many hardware nodes work together and are managed via management and orchestration (MANO) 26100, which, among others, oversees lifecycle management of applications 2620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2640 may be a software implementation of a physical machine that runs programs as if they were executing on a physical, non-virtualized machine. Each of virtual machines 2640, and that part of hardware 2630 that executes that virtual machine, be it hardware dedicated to that virtual machine and/or hardware shared by that virtual machine with others of the virtual machines 2640, forms a separate virtual network elements (VNE).

Still in the context of NFV, Virtual Network Function (VNF) is responsible for handling specific network functions that run in one or more virtual machines 2640 on top of hardware networking infrastructure 2630 and corresponds to application 2620 in FIG. 26.

In some embodiments, one or more radio units 26200 that each include one or more transmitters 26220 and one or more receivers 26210 may be coupled to one or more antennas 26225. Radio units 26200 may communicate directly with hardware nodes 2630 via one or more appropriate network interfaces and may be used in combination with the virtual components to provide a virtual node with radio capabilities, such as a radio access node or a base station.

In some embodiments, some signalling can be effected with the use of control system 26230 which may alternatively be used for communication between the hardware nodes 2630 and radio units 26200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for determining one or more temporal sublayer properties from a bitstream, the method comprising:

determining, from the bitstream, a number N of temporal sublayers for which one or more temporal sublayer properties are specified; and for each temporal sublayer of the N temporal sublayers having one or more temporal sublayer property values, decoding the one or more temporal sublayer property values from the bitstream wherein the one or more temporal sublayer property values comprises one or more of:

sublayer referencing information for at least one of the N temporal sublayers, wherein the method further comprises decoding a set of syntax elements into a set of syntax element values wherein each first syntax element value in the set of syntax element values specifies whether or not a first temporal sublayer of the N number of temporal sublayers is not a direct reference sublayer to a second temporal sublayer of the N number of temporal sublayers; and picture width and picture height per temporal sublayer information for at least one of the N temporal sublayers, wherein the method further comprises decoding, for each temporal sublayer of the at least one of the N temporal sublayers, a picture width value W from the bitstream and a picture height value H from the bitstream, wherein all pictures that belong to the temporal sublayer have a width equal to W and a height equal to H.

2. The method of claim 1, wherein decoding the set of syntax elements comprises decoding the set of syntax elements in accordance with

```
for( i = 0; i < num_sublayers; i++ )
    for( j = 0; j < i; j++ )
        flag[ i ][ j ]
``` where num_sublayers is the number N of temporal sublayers and flag [i][j] is a syntax element in the set of syntax elements and the value of flag [i][j] indicates whether or not temporal sublayer j is not a direct reference sublayer to temporal sublayer i.

3. The method of claim 1, wherein one value of a first syntax element indicates that there is no picture belonging to the first temporal sublayer in the bitstream that is used as a reference picture for any picture belonging to the second temporal sublayer in the bitstream.

4. The method of claim 1, wherein the one or more temporal sublayer property values comprises the output sublayer set information for at least one of the N temporal sublayers, the method further comprising:
determining at least one output sublayer set O comprising temporal sublayers by decoding a first set of syntax elements from the bitstream; and
decoding one or more pictures from the bitstream and outputting pictures that are included in temporal sublayers that are included in the at least one output sublayer set O.

5. The method of claim 4, further comprising obtaining two or more output sublayer sets from the bitstream, wherein none of the two or more output sublayer sets contains an identical set of temporal sublayers.

6. The method of claim 4, further comprising:
determining from the bitstream, for each temporal sublayer in the output sublayer set O, whether the temporal sublayer is an output sublayer in the output sublayer set O or is a non-output sublayer in the output sublayer set O, wherein the output sublayer set O contains at least one temporal sublayer that is an output sublayer and wherein the output sublayer set O contains at least one temporal sublayer that is a non-output sublayer; and
outputting only temporal sublayers that are included in the at least one output sublayer set O and determined from the bitstream to be an output sublayer in the output sublayer set O.

7. The method of claim 5, further comprising
selecting one output sublayer set O as a target output sublayer set T wherein the target output sublayer set T contains at least one temporal sublayer;
decoding each of the at least one temporal sublayer from the bitstream; and
outputting only temporal sublayers that are included in the target output sublayer set T.

8. The method of claim 1, wherein the picture width value W comprises one of an output picture width value or a maximum picture width value and the picture height value H comprises one of an output picture height value or a maximum picture height value.

9. The method of claim 1, wherein the one or more temporal sublayer property values comprises sublayer multiview information for at least one of the N temporal sublayers, the method further comprising decoding, for each of the at least one of the N temporal sublayers, a View ID value for the temporal sublayer.

10. The method of claim 1, wherein the one or more temporal sublayer property values comprises the sublayer auxiliary information for at least one of the N temporal sublayers, and the method further comprises determining that at least one temporal sublayer of the at least one of the N temporal sublayers contains auxiliary pictures comprising one of an alpha plane and depth picture.

11. The method of claim 1, wherein the one or more temporal sublayer property values comprises sublayer quality information for at least two of the N temporal sublayers comprising a first temporal sublayer and a second temporal sublayer, the method further comprising determining that a quality of the first temporal sublayer is higher than a quality of the second temporal sublayer.

12. The method of claim 1, wherein the one or more temporal sublayer property values are decoded from an entry, box, or a property unit in a systems layer of the bitstream.

13. The method of claim 1, further comprising:
decoding a picture from the bitstream based on the one or more temporal sublayer property values of at least one temporal sublayer.

14. A decoder comprising:
processing circuitry; and
memory coupled with the processing circuitry, wherein the memory includes instructions that when executed by the processing circuitry causes the decoder to perform operations comprising:
determining, from the bitstream, a number N of temporal sublayers for which one or more temporal sublayer properties are specified; and
for each temporal sublayer of the N temporal sublayers having one or more temporal sublayer property values, decoding the one or more temporal sublayer property values from the bitstream wherein the one or more temporal sublayer property values comprises one or more of:
sublayer referencing information for at least one of the N temporal sublayers, wherein the operations further comprise decoding a set of syntax elements into a set of syntax element values wherein each first syntax element value in the set of syntax element values specifies whether or not a first temporal sublayer of the N number of temporal sublayers is not a direct reference sublayer to a second temporal sublayer of the N number of temporal sublayers; and
picture width and picture height per temporal sublayer information for at least one of the N temporal sublayers, wherein the operations further comprise decoding, for each temporal sublayer of the at least one of the N temporal sublayers, a picture width value W from the bitstream and a picture height value H from the bitstream, wherein all pictures that belong to the temporal sublayer have a width equal to W and a height equal to H.

15. A method for encoding one or more temporal sublayer properties into a bitstream, the method comprising:
determining a number N of temporal sublayers having one or more temporal sublayer property values to be encoded into the bitstream; and
for each temporal sublayer of the N temporal sublayers, encoding the one or more temporal sublayer property values into the bitstream wherein the one or more temporal sublayer property values comprises one or more of:

sublayer referencing information for at least one of the N temporal sublayers, wherein the method further comprises encoding a set of syntax element values into a set of syntax elements wherein each first syntax element value in the set of syntax element values specifies whether or not a first temporal sublayer of the N number of temporal sublayers is not a direct reference sublayer to a second temporal sublayer of the N number of temporal sublayers; and picture width and picture height per temporal sublayer information for at least one of the N temporal sublayers, wherein the method further comprises encoding, for each temporal sublayer of the at least one of the N temporal sublayers, a picture width value W into the bitstream and a picture height value H into the bitstream, specifying that all pictures that belong to the temporal sublayer have a width equal to W and a height equal to H.

16. The method of claim 15, wherein one value of a first syntax element indicates that there is no picture belonging to the first temporal sublayer in the bitstream that is used as a reference picture for any picture belonging to the second temporal sublayer in the bitstream.

17. The method of claim 15, wherein the one or more temporal sublayer property values comprises the sublayer auxiliary information for at least one of the N temporal sublayers, and the method further comprises encoding information indicating that at least one temporal sublayer of the at least one of the N temporal sublayers contains auxiliary pictures, the auxiliary pictures comprising one of an alpha plane and depth picture.

18. The method of claim 15, further comprising encoding the one or more temporal sublayer property values into an entry, a box, or a property unit in a systems layer of the bitstream.

19. The method of claim 15, further comprising:
encoding a picture into the bitstream based on the one or more temporal sublayer property values.

20. An encoder comprising:
processing circuitry; and
memory coupled with the processing circuitry, wherein the memory includes instructions that when executed by the processing circuitry causes the communication device to perform operations comprising:
determining a number N of temporal sublayers having one or more temporal sublayer property values to be encoded into the bitstream; and
for each temporal sublayer of the N temporal sublayers, encoding the one or more temporal sublayer property values into the bitstream wherein the one or more temporal sublayer property values comprises one or more of:
sublayer referencing information for at least one of the N temporal sublayers, wherein the operations further comprise encoding a set of syntax element values into a set of syntax elements wherein each first syntax element value in the set of syntax element values specifies whether or not a first temporal sublayer of the N number of temporal sublayers is not a direct reference sublayer to a second temporal sublayer of the N number of temporal sublayers; and
picture width and picture height per temporal sublayer information for at least one of the N temporal sublayers, wherein the operations further comprise encoding, for each temporal sublayer of the at least one of the N temporal sublayers, a picture width value W into the bitstream and a picture height value H into the bitstream, specifying that all pictures that belong to the temporal sublayer have a width equal to W and a height equal to H.

* * * * *